(12) United States Patent
Watanabe et al.

(10) Patent No.: US 8,330,786 B2
(45) Date of Patent: Dec. 11, 2012

(54) OPTICAL SCANNER AND IMAGE FORMING APPARATUS INCORPORATING SAME

(75) Inventors: Kazunori Watanabe, Tama (JP);
Takeshi Yamakawa, Fujisawa (JP)

(73) Assignee: Ricoh Company, Ltd., Tokyo (JP)

( * ) Notice: Subject to any disclaimer, the term of this patent is extended or adjusted under 35 U.S.C. 154(b) by 540 days.

(21) Appl. No.: 12/457,045

(22) Filed: May 29, 2009

(65) Prior Publication Data

US 2009/0295899 A1 Dec. 3, 2009

(30) Foreign Application Priority Data

Jun. 2, 2008 (JP) ................................ 2008-144532

(51) Int. Cl.
*B41J 2/435* (2006.01)
(52) U.S. Cl. ........................................ 347/263; 347/245
(58) Field of Classification Search .................. 347/263, 347/245
See application file for complete search history.

(56) References Cited

U.S. PATENT DOCUMENTS

| 6,072,516 | A | 6/2000 | Yamakawa | |
|---|---|---|---|---|
| 6,157,478 | A * | 12/2000 | Naiki et al. | 359/204.1 |
| 6,243,128 | B1 * | 6/2001 | Yamakawa | 347/263 |
| 7,619,797 | B2 * | 11/2009 | Nakajima | 359/198.1 |
| 7,663,656 | B2 * | 2/2010 | Yamazaki | 347/242 |
| 7,782,345 | B2 * | 8/2010 | Evanicky et al. | 345/690 |
| 2004/0169716 | A1 * | 9/2004 | Serizawa et al. | 347/245 |
| 2005/0012974 | A1 | 1/2005 | Ono et al. | |
| 2005/0024475 | A1 * | 2/2005 | Futakami et al. | 347/238 |
| 2007/0122192 | A1 | 5/2007 | Yamakawa et al. | |
| 2007/0165099 | A1 | 7/2007 | Yoshizawa et al. | |
| 2008/0225349 | A1 | 9/2008 | Watanabe | |
| 2009/0009826 | A1 | 1/2009 | Watanabe | |

FOREIGN PATENT DOCUMENTS

| CN | 1975505 | 6/2007 |
|---|---|---|
| JP | 10-003047 | 1/1998 |
| JP | 2000-098278 | 4/2000 |

OTHER PUBLICATIONS

Chinese Office Action dated Dec. 16, 2010.

* cited by examiner

*Primary Examiner* — Julian Huffman
*Assistant Examiner* — Sharon A Polk
(74) *Attorney, Agent, or Firm* — Harness, Dickey & Pierce, P.L.C.

(57) ABSTRACT

An optical scanner includes at least one light source, an optical element, a deflective scanner, an optical housing, a pressing member, and a mounting member. The light source emits a light beam to an object. The optical element forms the light beam emitted from the light source into a desired shape. The deflective scanner deflects the light beam. The optical housing stores the optical element and the deflective scanner, and includes at least one positioning member. The positioning member positions the light source in an axial direction of the light source. The pressing member presses the light source toward the positioning member to sandwich the light source between the pressing member and the positioning member and mount the light source on the optical housing. The mounting member fastens the pressing member to the optical housing.

17 Claims, 15 Drawing Sheets

OPTICAL SCANNER AND IMAGE FORMING APPARATUS INCORPORATING SAME

PRIORITY STATEMENT

The present patent application claims priority from Japanese Patent Application No. 2008-144532, filed on Jun. 2, 2008 in the Japan Patent Office, the entire contents of which are hereby incorporated herein by reference.

BACKGROUND OF THE INVENTION

1. Field of the Invention

Example embodiments generally relate to an optical scanner and an image forming apparatus incorporating the optical scanner, for example, for easily replacing a light source and efficiently adjusting a beam pitch.

2. Description of the Related Art

Image forming apparatuses, such as copiers, facsimile machines, printers, and multifunction devices having at least one of copying, printing, scanning, and facsimile functions, typically form a toner image on a recording medium (e.g., a transfer sheet) based on image data using one of several electrophotographic methods.

Thus, for example, a charging device charges a surface of a photoconductor, serving as a latent image carrier. An optical scanner emits a light beam onto the charged surface of the photoconductor to form an electrostatic latent image on the photoconductor according to the image data. A development device develops the electrostatic latent image with a developer (e.g., toner) into a visible toner image. After a transfer device transfers the toner image onto a transfer sheet, the toner image is fixed on the transfer sheet by heat and pressure applied by a fixing device, thereby forming the toner image on the transfer sheet.

Typically, optical scanners use a laser diode (LD) as a light source for emitting the light beam. The light beam emitted from the LD is formed into a predetermined shape via a collimate lens and an aperture, and directed onto a polygon mirror that then deflects the light beam to form an image on a surface of a photoconductor.

One known related-art optical scanner includes a holder for holding the light source. The light source is inserted into a light source mounting portion of the holder, thereby limiting its susceptibility to environmental changes such as temperature changes.

However, when a failure occurs in the light source, the light source needs to be removed from the light source mounting portion. Care must be taken with its removal, however, if a user pulls out the light source from the holder with too much force, the light source mounting portion may be damaged.

Moreover, since the LD as a light source has a vertical divergence angle different from a lateral divergence angle, the light beam emitted by the LD has an elliptical shape. Thus, in order to form the light beam after passing through the aperture into a desired shape, a major axis of the elliptical light beam needs to correspond to the orientation of the aperture split. However, the LD cannot rotate after being mounted in the light source mounting portion by press-fitting. Therefore, when the major axis of the light beam deviates from the orientation of the slit of the aperture, the light beam cannot be formed into the desired shape.

Another related-art optical scanner uses a multi-beam scanning method, which uses a laser diode array (LDA) including a plurality of light-emitting points as light sources arranged in array. In order to obtain a desired beam pitch, the light source needs to be attached to the light source mounting portion after defining a position of the light source in a rotational direction. However, the light source cannot rotate once it is mounted in the mounting portion, and thus the beam pitch cannot be adjusted.

If the holder holding the light source is rotatably attached to a housing so as to rotate independently from the housing, the position of the light source in a rotational direction can be adjusted, thereby making the beam pitch adjustable. However, provision of such a rotatable holder increases the number of components and thus the cost of the apparatus.

Accordingly, there is a need for a technology capable of easily attaching and removing a light source and efficiently adjusting a beam pitch after attachment of the light source while reducing the number of components.

SUMMARY

At least one embodiment provides an optical scanner that includes at least one light source, an optical element, a deflective scanner, an optical housing, a pressing member, and a mounting member. The light source is configured to emit a light beam to an object. The optical element is configured to form the light beam emitted from the light source into a desired shape. The deflective scanner is configured to deflect the light beam. The optical housing is configured to house the optical element and the deflective scanner, and includes at least one positioning member. The positioning member is configured to position the light source in an axial direction of the light source. The pressing member is configured to press the light source toward the positioning member to sandwich the light source between the pressing member and the positioning member and mount the light source on the optical housing. The mounting member is configured to fasten the pressing member to the optical housing.

Further, at least one embodiment provides an image forming apparatus that includes an optical scanner. The optical scanner includes a light source, an optical element, a deflective scanner, an optical housing, a pressing member, and a mounting member as described above.

Additional features and advantages of example embodiments will be more fully apparent from the following detailed description, the accompanying drawings, and the associated claims.

BRIEF DESCRIPTION OF THE DRAWINGS

A more complete appreciation of example embodiments and the many attendant advantages thereof will be readily obtained as the same becomes better understood by reference to the following detailed description when considered in connection with the accompanying drawings, wherein.

Figure 1:
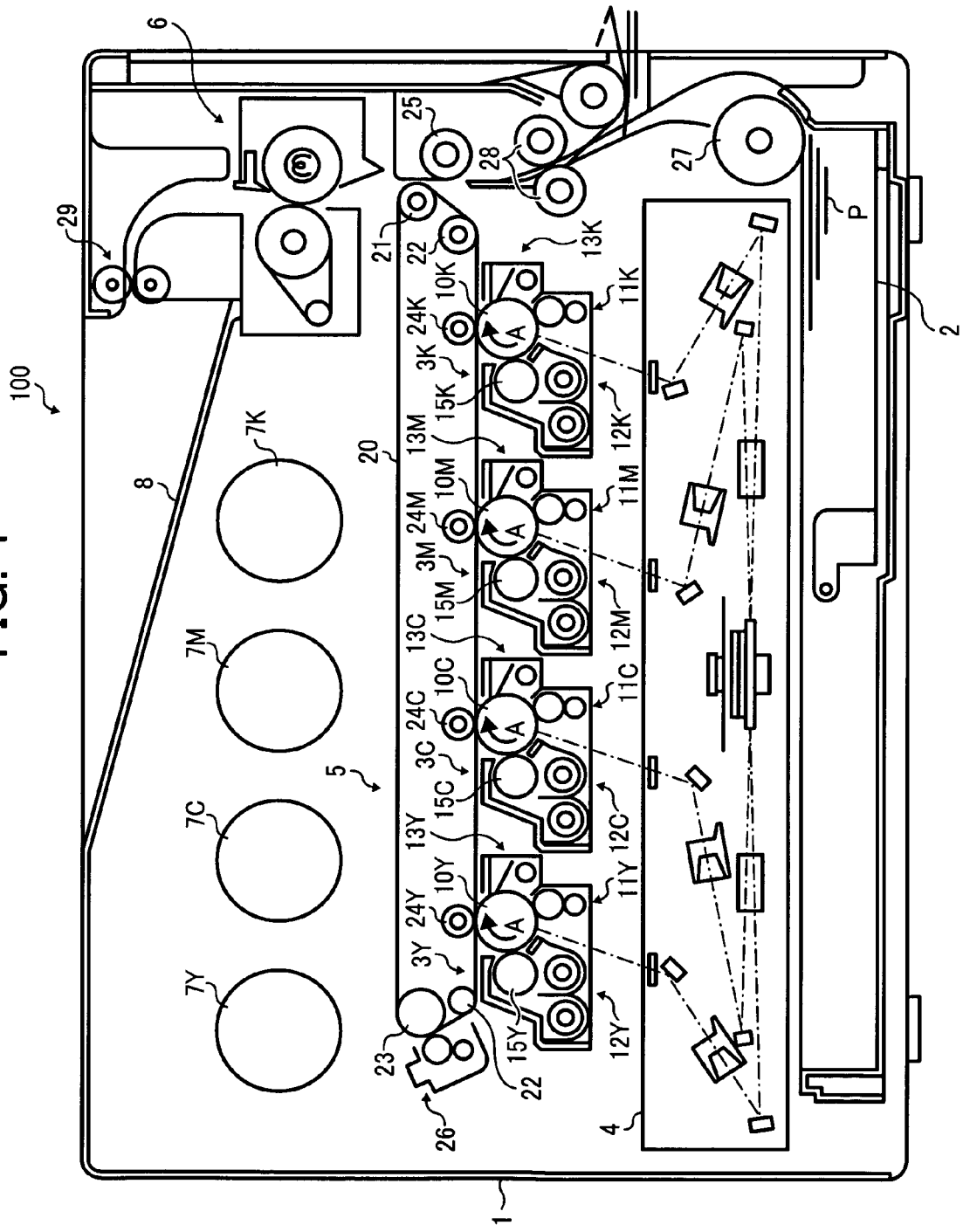
FIG. 1 is a schematic sectional view of a tandem-type full color image forming apparatus according to an example embodiment.

The accompanying drawings are intended to depict example embodiments and should not be interpreted to limit the scope thereof. The accompanying drawings are not to be considered as drawn to scale unless explicitly noted.

DETAILED DESCRIPTION OF EXAMPLE EMBODIMENTS

It will be understood that if an element or layer is referred to as being "on", "against", "connected to", or "coupled to" another element or layer, then it can be directly on, against, connected or coupled to the other element or layer, or intervening elements or layers may be present. By contrast, if an element is referred to as being "directly on", "directly connected to", or "directly coupled to" another element or layer, then there are no intervening elements or layers present. Like numbers refer to like elements throughout. As used herein, the term "and/or" includes any and all combinations of one or more of the associated listed items.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this specification is not intended to be limited to the specific terminology so selected and it is to be understood that each specific element includes all technical equivalents that operate in a similar manner and achieve a similar result.

Referring now to the drawings, wherein like reference numerals designate identical or corresponding parts throughout the several views thereof, in particular to FIG. 1, the structure of an image forming apparatus 100 according to an example embodiment of the present invention is described.

FIG. 1 is a schematic sectional view of the tandem-type image forming apparatus 100 using an intermediate transfer method. The image forming apparatus 100 includes a body 1 and/or a paper tray 2. The body 1 includes an image forming stations 3Y, 3C, 3M, and 3K, an optical writing unit 4, an intermediate transfer unit 5, a fixing unit 6, toner bottles 7Y, 7C, 7M, and 7K, a discharge tray 8, a discharge roller 27, a pair of registration rollers 28, and/or a discharge roller 29. The image forming stations 3Y, 3C, 3M, and 3K include photoconductors 10Y, 10C, 10M, and 10K, charging devices 11Y, 11C, 11M, and 11K, development devices 12Y, 12C, 12M, and 12K, and/or cleaning devices 13Y, 13C, 13M, and 13K, respectively. The development devices 12Y, 12C, 12M, and 12K include development rollers 15Y, 15C, 15M, and 15K, respectively. The intermediate transfer unit 5 includes an intermediate transfer belt 20, a driving roller 21, tension rollers 22, a driven roller 23, primary transfer rollers 24Y, 24C, 24M, and 24K, and/or a secondary transfer roller 25.

The image forming apparatus 100 may be a copier, a facsimile machine, a printer, a multifunction printer having at least one of copying, printing, scanning, and facsimile functions, or the like. According to this non-limiting example embodiment, the image forming apparatus 100 functions as a tandem-type color copier for forming a color image on a recording medium (e.g., a transfer sheet) by electrophotography. However, the image forming apparatus 100 is not limited to the color copier and may form a color and/or monochrome image in other configurations.

The paper tray 2 can be pulled out from the body 1. The image forming stations 3Y, 3C, 3M, and 3K are provided in the central portion of the image forming apparatus 100, and form yellow, cyan, magenta, and black visible toner images, respectively.

Figure 2:
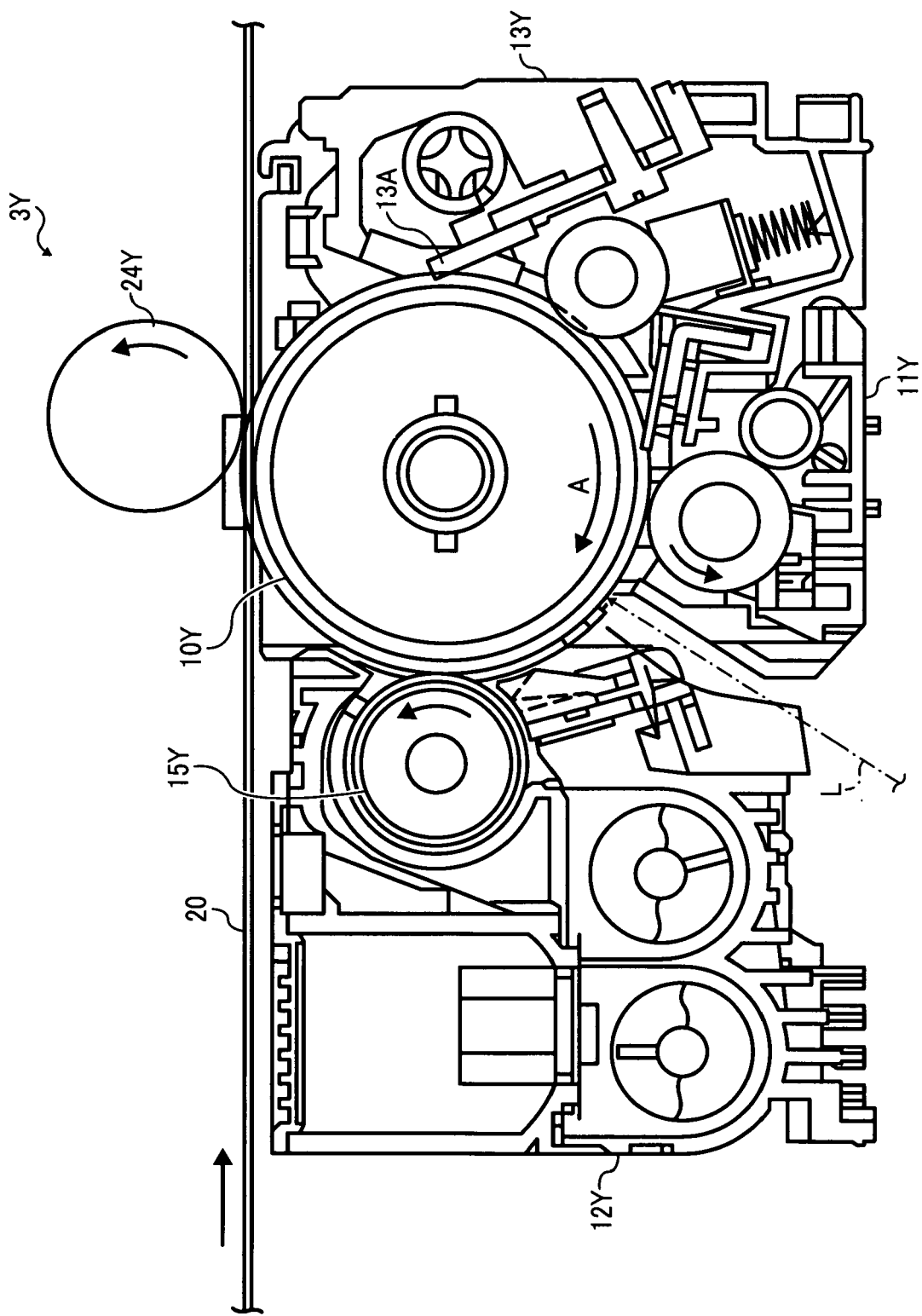
FIG. 2 is a schematic sectional view (according to an example embodiment) of an image forming station included in the image forming apparatus shown in FIG. 1.

FIG. 2 is a schematic sectional view of the image forming station 3Y. The cleaning device 13Y of the image forming station 3Y includes a cleaning blade 13A. It is to be noted that the image forming stations 3C, 3M, and 3K have a structure equivalent to that of the image forming station 3Y. The drum-shaped photoconductors 10Y, 10C, 10M, and 10K, serving as latent image carriers, rotate in a direction A, respectively, and include cylindrical base bodies made of aluminum, having a diameter of about 40 mm and a photosensitive layer of an OPC (organic photo conductor), for example, covering surfaces of the base bodies. The charging devices 11Y, 11C, 11M, and 11K, development devices 12Y, 12C, 12M, and 12K, and cleaning devices 13Y, 13C, 13M, and 13K are provided around the photoconductors 10Y, 10C, 10M, and 10K, respectively. The charging devices 11Y, 11C, 11M, and 11K charge the photoconductors 10Y, 10C, 10M, and 10K. The development devices 12Y, 12C, 12M, and 12K develop latent images formed on the photoconductors 10Y, 10C, 10M, and 10K. The cleaning devices 13Y, 13C, 13M, and 13K remove residual toner remaining on the photoconductors 10Y, 10C, 10M, and 10K. The optical writing unit 4, serving as an optical scanner, is provided below the image forming stations 3Y, 3C, 3M, and 3K, and can emit a writing beam L to the photoconductors 10Y, 10C, 10M, and 10K. The intermediate transfer unit 5 is provided above the image forming stations 3Y, 3C, 3M, and 3K. The toner images formed by the image forming stations 3Y, 3C, 3M, and 3K are transferred onto the intermediate transfer belt 20. The fixing unit 6 fixes the toner images transferred onto the intermediate transfer belt 20 to a transfer sheet P as a recording material. The toner bottles 7Y, 7C, 7M, and 7K are provided in an upper portion of the body 1, and store yellow, cyan, magenta, and black toner, respectively. When a user opens the discharge tray 8 provided above the body 1, the toner bottles 7Y, 7C, 7M, and 7K are detachably attached to the body 1.

The optical writing unit 4 deflects the writing beam (laser beam) L emitted from a laser diode as a light source using a polygon mirror, or the like, and emits the laser beam L to the photoconductors 10Y, 10C, 10M, and 10K. A detailed description of the optical writing unit 4 is described later.

As illustrated in FIG. 1, the intermediate transfer belt 20 of the intermediate transfer unit 5 is wrapped around the driving roller 21, the tension rollers 22, and the driven roller 23, and properly driven to rotate in a counterclockwise direction. The primary transfer rollers 24Y, 24C, 24M, and 24K transfer the toner images formed on the photoconductors 10Y, 10C, 10M, and 10K to the intermediate transfer belt 20. The secondary transfer roller 25 transfers the toner images transferred onto the intermediate transfer belt 20 to the transfer sheet P. The belt cleaner 26 removes residual toner remaining on the intermediate transfer belt 20.

A process of color image formation performed by the image forming apparatus 100 is described.

When the photoconductors 10Y, 10C, 10M, and 10K are uniformly charged by the charging devices 11Y, 11C, 11M, and 11K, the optical writing unit 4 emits a laser beam L to surfaces of the photoconductors 10Y, 10C, 10M, and 10K based on image information to form latent images thereon, respectively. Then, the development rollers 15Y, 15C, 15M, and 15K of the development devices 12Y, 12C, 12M, and 12K develop the latent images with respective color toner to make the latent images visible as toner images. The primary transfer rollers 24Y, 24C, 24M, and 24K transfer the toner images formed on the photoconductors 10Y, 10C, 10M, and 10K onto the intermediate transfer belt 20 driven to rotate counter-clockwise. Since the toner images are transferred to intermediate transfer belt 20 at slightly different times, the toner images are sequentially superimposed on a same position of the intermediate transfer belt 20. After primary transfer, the cleaning devices 13Y, 13C, 13M, and 13K clean the surfaces of the photoconductors 10Y, 10C, 10M, and 10K to prepare for subsequent image formation. Predetermined amounts of yellow, cyan, magenta, and black toner stored in the toner bottles 7Y, 7C, 7M, and 7K are supplied to the development devices 12Y, 12C, 12M, and 12K via a conveyance path as necessary.

The feed roller 27 is provided in the vicinity of the paper tray 2, and conveys the transfer sheet P stored in the paper tray 2 inside the body 1. Then, the pair of registration rollers 28 properly conveys the transfer sheet P to a secondary transfer device. The secondary transfer device transfers the toner image formed on the intermediate transfer belt 20 to the transfer sheet P. When the transfer sheet P bearing the toner image passes through the fixing unit 6, the toner image is fixed to the transfer sheet P. Then, the discharge roller 29 discharges the transfer sheet P to the discharge tray 8. As with the photoconductors 10Y, 10C, 10M, and 10K, residual toner remaining on the intermediate transfer belt 20 is removed by the belt cleaner 26 contacting the intermediate transfer belt 20.

Figure 3:
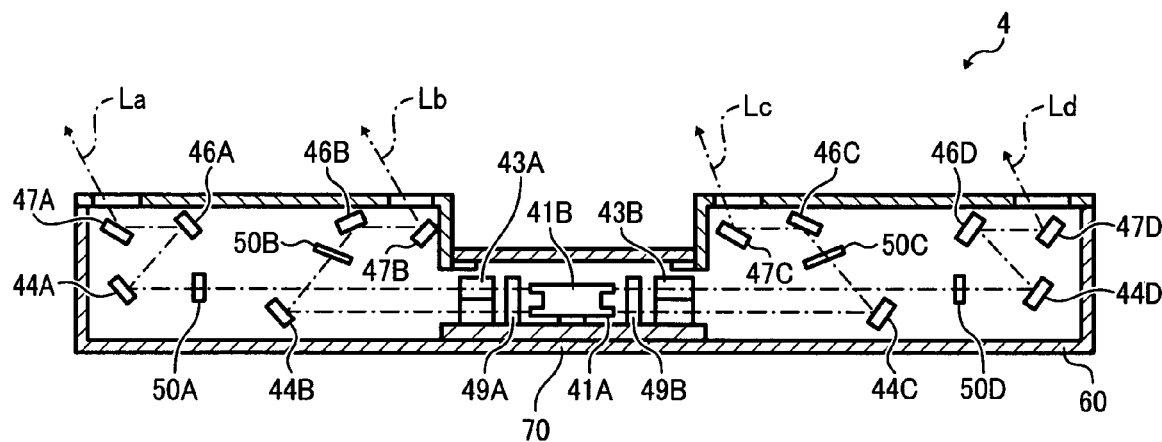
FIG. 3 is a schematic sectional view (according to an example embodiment) of an optical writing unit included in the image forming apparatus shown in FIG. 1.

Referring to FIGS. 3, 4, 5, and 6, a description is now given of a structure of the optical writing unit 4. FIG. 3 is a schematic sectional view of the optical writing unit 4. The optical writing unit 4 includes a first case 70 and/or a second case 60. The first case 70 includes fθ lenses 43A and 43B, polygon mirrors 41A and 41B, and/or soundproof glasses 49A and 49B. The second case 60 includes mirrors 44A, 44B, 44C, 44D, 46A, 46B, 46C, 46D, 47A, 47B, 47C, and 47D and/or long lenses 50A, 50B, 50C, and 50D.

Figure 4:
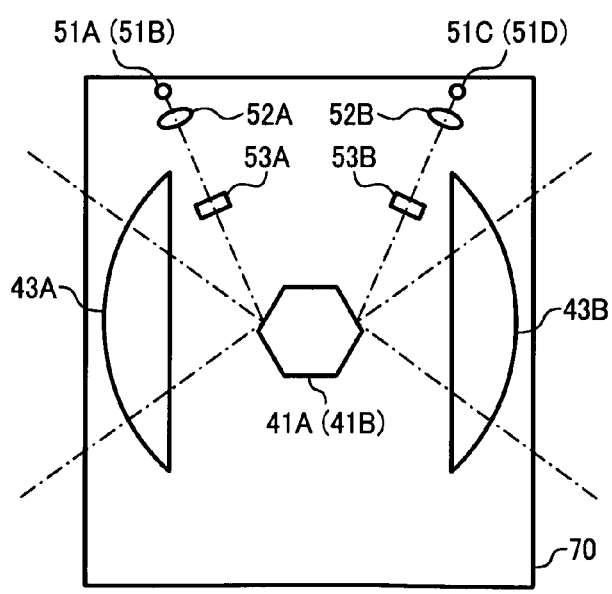
FIG. 4 is a schematic top view (according to an example embodiment) of a first case included in the optical writing unit shown in FIG. 3.
Figure 5:
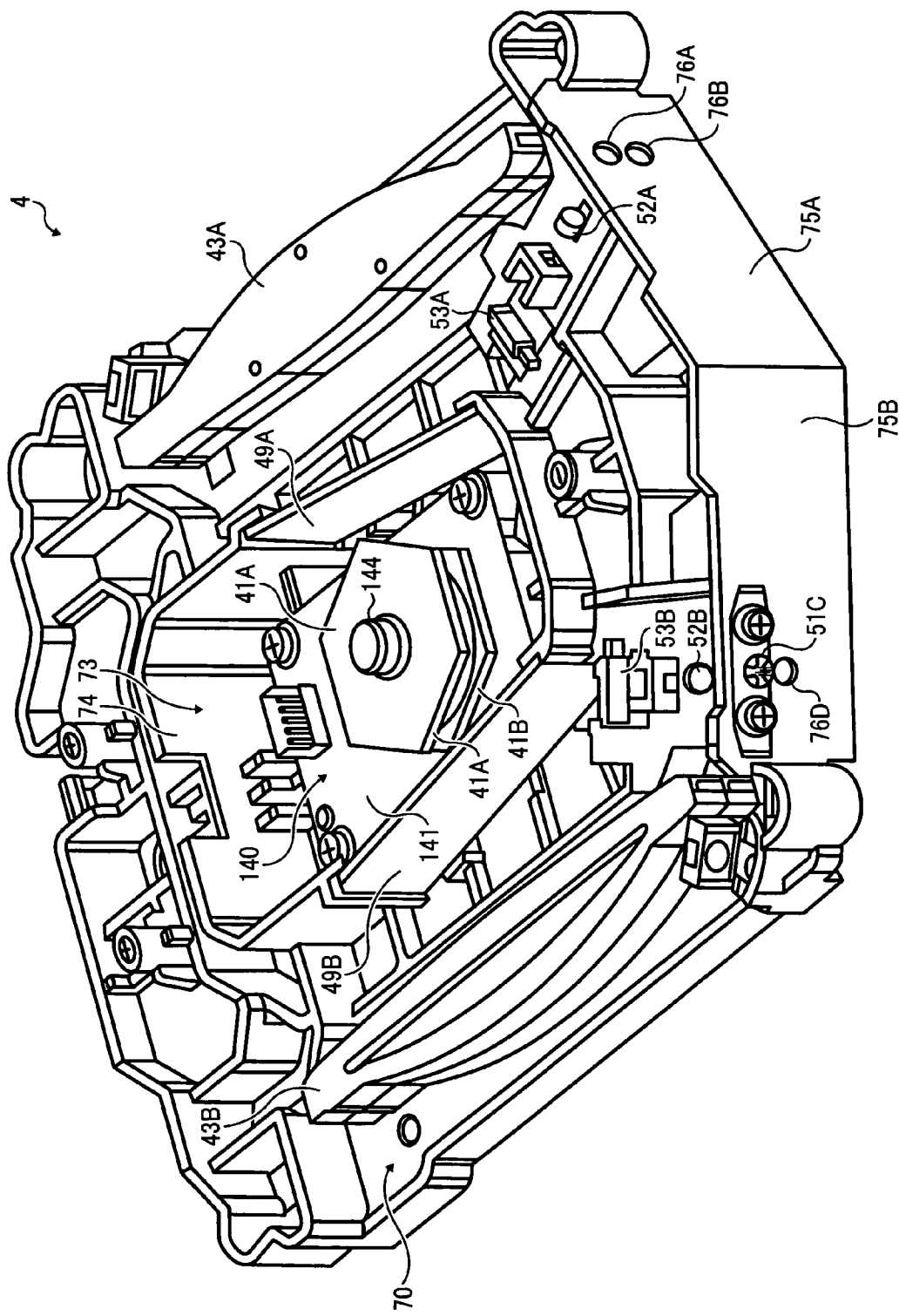
FIG. 5 is a schematic perspective view (according to an example embodiment) of the optical writing unit shown in FIG. 3.

FIG. 4 is a schematic top view of the first case 70. FIG. 5 is a schematic perspective view of the first case 70. As illustrated in FIG. 4, the first case 70 further includes LDAs (laser diode arrays) 51A, 51B, 51C, and 51D, collimate lenses 52A and 52B, and/or cylindrical lenses 53A and 53B. As illustrated in FIG. 5, the first case 70 further includes light source mounting surfaces 75A and 75B, light source mounting holes 76A, 76B, 76C (not shown), and 76D, a circuit board 141, and/or a polygon motor 144.

The first case 70 stores optical system components provided on an optical path from the LDAs 51A, 51B, 51C, and 51D as a light source to the fθ lenses 43A and 43B. The second case 60 stores optical system components provided on an optical path from the fθ lenses 43A and 43B to the photoconductors 10Y, 10C, 10M, and 10K.

The optical writing unit 4 uses a multi-beam scanning method for simultaneously scanning each surface of the photoconductors 10Y, 10C, 10M, and 10K using the LDA directing a plurality of beams to the photoconductors 10Y, 10C, 10M, and 10K, thereby increasing the speed of image formation.

As illustrated in FIGS. 4 and 5, the first case 70, serving as an optical housing, stores the collimate lenses 52A and 52B, the cylindrical lenses 53A and 53B, the polygon scanner 140, and the fθ lenses 43A and 43B. The collimate lenses 52A and 52B and the cylindrical lenses 53A and 53B are optical elements for forming light beams emitted from the LDAs 51A, 51B, 51C, and 51D into a desired shape. The polygon scanner 140 depicted in FIG. 5, serving as a deflective scanner, deflects the light beam. The fθ lenses 43A and 43B change an equiangular motion of the laser beam to a linear uniform motion.

As illustrated in FIG. 5, the LDAs 51A, 51B, 51C, and 51D are provided on the light source mounting holes 76A, 76B, 76C, and 76D of the light source mounting surfaces 75A and 75B provided at an end portion of the first case 70. It is to be noted that FIG. 5 shows that the LDA 51C is installed in the first case 70.

The polygon mirrors 41A and 41B each is a rotary polarizer, and has a regular polygonal columnar shape. The circuit board 141 mounts electronic components for controlling the polygon motor 144. The polygon scanner 140 is fastened with a screw to the polygon scanner accommodation portion 73 surrounded by the polygon scanner accommodation wall 74.

The fθ lenses 43A and 43B are installed in a scanning lens accommodation portion of the first case 70. The collimate lenses 52A, 52B and the cylindrical lenses 53A, 53B are provided on an optical path from the LDAs 51A, 51B, 51C, and 51D to the polygon mirrors 41A and 41B, respectively. The sound proof glasses 49A and 49B are provided on the polygon scanner accommodation wall 74 of the first body 70.

Figure 6:
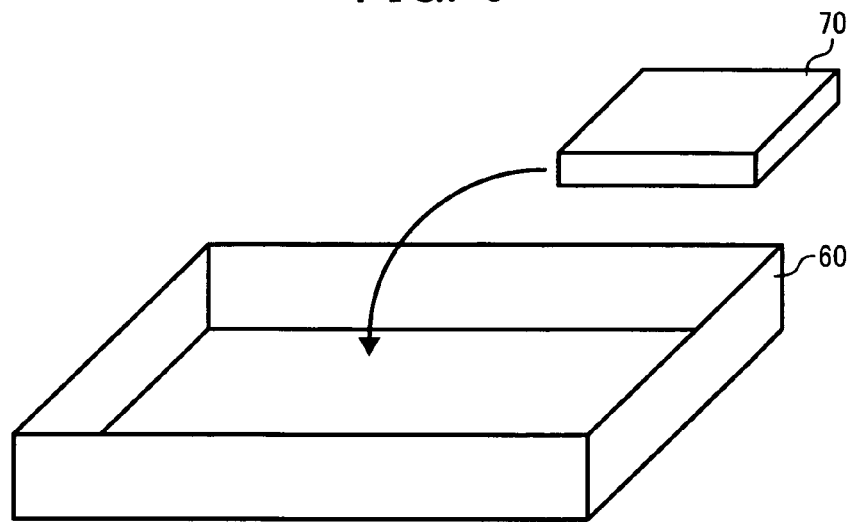
FIG. 6 is a schematic view (according to an example embodiment) of the first case and a second case included in the optical writing unit shown in FIG. 3.

FIG. 6 illustrates outlines of the first case 70 and the second case 60. The first case 70 is installed in the second case 60.

Referring back to FIG. 3, the first case 70, the mirrors 44A, 44B, 44C, 44D, 46A, 46B, 46C, 46D, 47A, 47B, 47C, and 47D, and the long lenses 50A, 50B, 50C, and 50D are provided in the second case 60. The mirrors 44A, 44B, 44C, 44D, 46A, 46B, 46C, 46D, 47A, 47B, 47C, and 47D lead a laser beam to the photoconductors 10Y, 10C, 10M, and 10K. The long lenses 50A, 50B, 50C, and 50D correct a fall of an optical surface of the polygon mirrors 41A and 41B. In addition, a synchronous detector is provided in the second case 60. It is to be noted that La, Lb, Lc, and Ld indicate optical paths of light beams emitted to the photoconductors 10Y, 10C, 10M, and 10K, respectively.

As illustrated in FIG. 4, after passing through the collimate lens 52A (52B), the light beams emitted from the LDAs 51A, 51B, 51C, and 51D are formed into a predetermined shape via an aperture provided in the first case 70. Then, after passing the cylindrical lens 53A (53B), the light beams are collected in a sub-scanning direction (a direction corresponding to a direction of movement of the surfaces of the photoconductors 10Y, 10C, 10M, and 10K). Thereafter, the light beam is reflected by one of six mirror surfaces of the polygon mirror 41A (41B) driven by the polygon motor 144 depicted in FIG. 5 to rotate at a high speed and deflected at a constant angular speed in a main-scanning direction (a direction corresponding to a direction of an axis of the photoconductors 10Y, 10C, 10M, and 10K). The fθ lens 43A (43B) makes the deflected light beam to move at a uniform velocity. Then, after sequentially passing through mirrors 44A, 44B (44C, 44D), 46A, 46B (46C, 46D), 47A, 47B (47C, 47D), the long lenses 50A, 50B (50C, 50D), and a dustproof glass for sealing the optical writing unit 4, the light beams reach the surfaces of the photoconductors 10Y, 10C, 10M, and 10K, respectively.

Referring to FIGS. 7, 8, 9, 10, 11, 12, and 13, a description is now given of attachment of the LDA 51C to the first case 70. The description is applicable to the LDAs 51A, 51B, and 51D as well.

Figure 7:
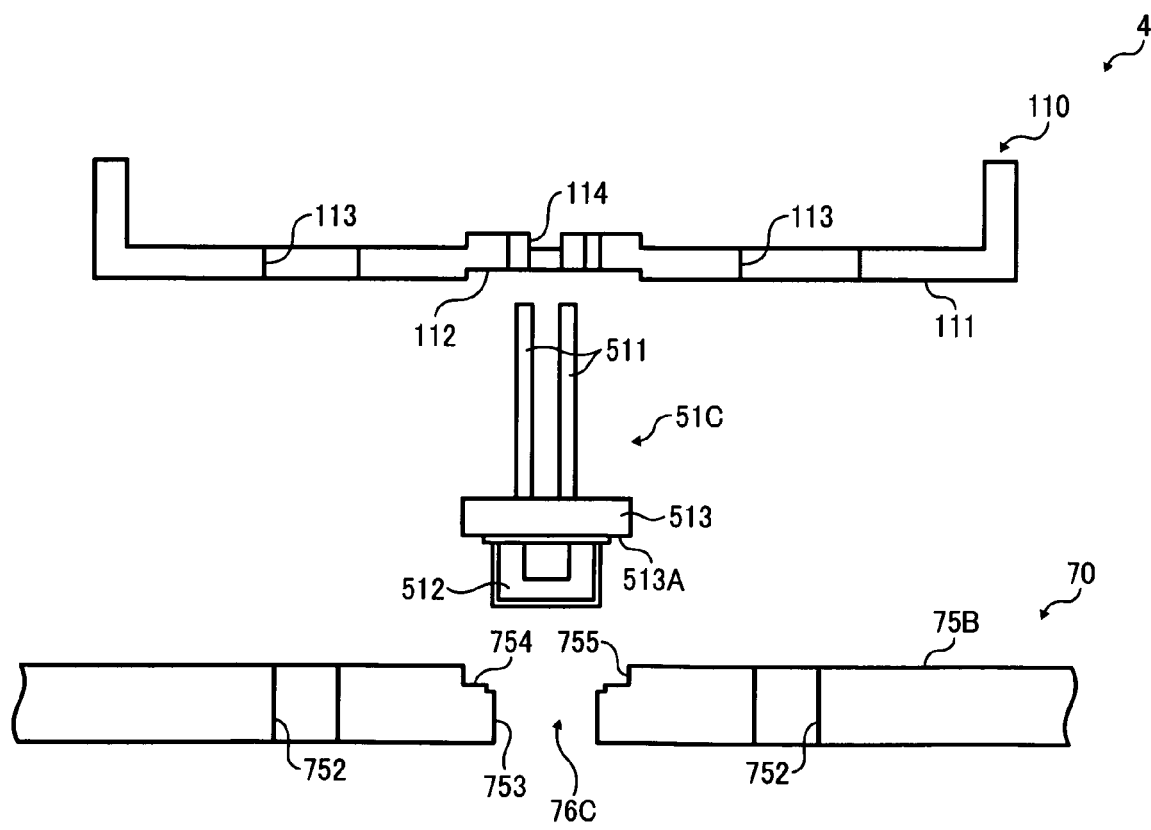
FIG. 7 is a partial sectional view (according to an example embodiment) of a pressing member, a LDA (laser diode array), and the first case included in the optical writing unit shown in FIG. 5.

FIG. 7 is a partial sectional view of the optical writing unit 4. The optical writing unit 4 further includes a pressing member 110. The pressing member 110 includes a mounting surface 111, a pressing surface 112 formed in the mounting surface 111, a screw hole 113 formed in the mounting surface 111, and/or a through-hole 114 formed in the pressing surface 112. The first case 70 further includes a screw hole 752 formed in the light source mounting surface 75B, a light-emitter receiver 753 formed in the light source mounting hole 76C, a base receiver 755, and/or a positioning surface 754. The LDA 51C includes a feeding member 511, a light-emitter 512, and/or a base 513 including a reference plane 513A An outer diameter of the base 513 is greater than that of the light-emitter 512. The reference surface 513A opposing the light-emitter 512 defines a position of the LDA 51C in an axial direction. The feeding member 511 projects from a surface of the base 513 opposite to the reference surface 513A and is connected to a control board, described later, to supply power to a light-emitting element arranged in array inside the light-emitter 512.

The light source mounting hole 76C and the screw hole 752 are provided on the light source mounting surface 75B of the first case 70. The light-emitter receiver 753 and the base receiver 755 are provided in the light source mounting hole 76C. The light-emitter receiver 753 has a diameter slightly greater than that of the light-emitter 512 of the LDA 51C. The base receiver 755 has a diameter slightly greater than that of the base 513 of the LDA 51C. The positioning surface 754, serving as a positioning member for positioning the LDA 51C in the axial direction, is perpendicular to the axial direction of the LDA 51C and connects the base receiver 755 and the light-emitter receiver 753. The base receiver 755 has a length smaller than that of the base 513 in the axial direction of the LDA 51C. When the positioning surface 754 receives the LDA 51C, one part of the base 513 projects from the light source mounting surface 75B.

Figure 8:
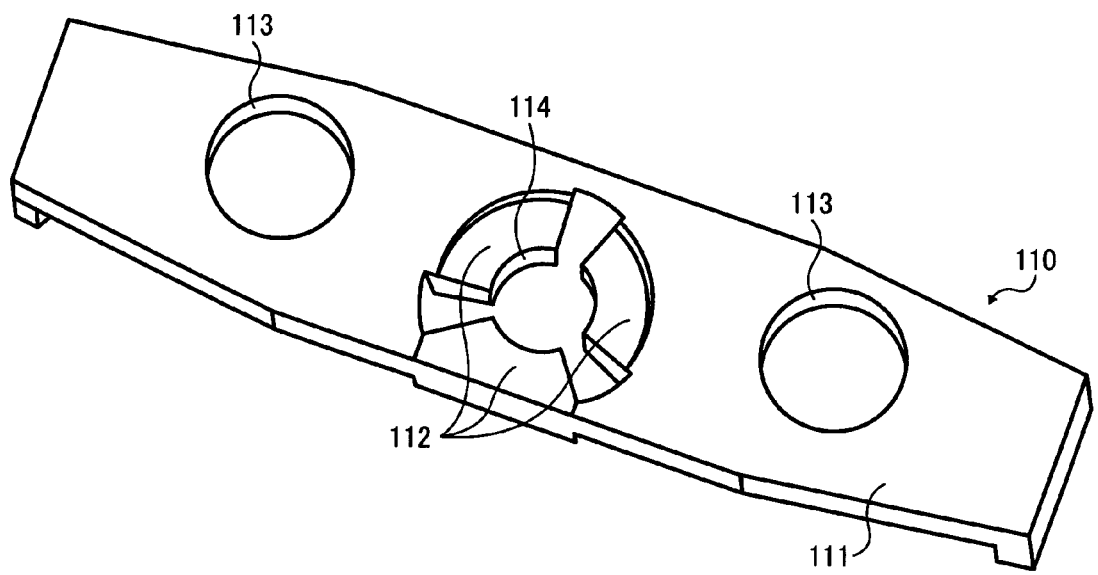
FIG. 8 is a perspective view (according to an example embodiment) of the pressing member shown in FIG. 7.

FIG. 8 is a perspective view of the pressing member 110. The pressing member 110 for pressing the LDA 51C has a rectangular plate-like shape, and is made of curved sheet metal or injection-molded resin. The through-hole 114 through which the feeding member 511 of the LDA 51C depicted in FIG. 7 is inserted is provided in a substantially central portion of the pressing member 110. Three pressing surfaces 112 occupying the same plane are equally spaced in a circumferential direction around the through-hole 114 such that the pressing surfaces 112 surround the through-hole 114 and oppose a surface of the base 513 depicted in FIG. 7 opposite to the reference surface 513A, so as to press the LDA 51C toward the positioning surface 754. Each pressing surface 112 has the same shape as any other and is disposed perpendicular to the axial direction of the LDA 51C, so as to properly press the LDA 51C in the axial direction of the LDA 51C. The screw hole 113 for a screw is provided outward from the pressing surface 112 in a longitudinal direction of the pressing member 110.

As illustrated in FIG. 7, the pressing surface 112 is parallel to the mounting surface 111 and farther from the first body 70 in the axial direction of the LDA 51C than the mounting surface 111.

Figure 9:
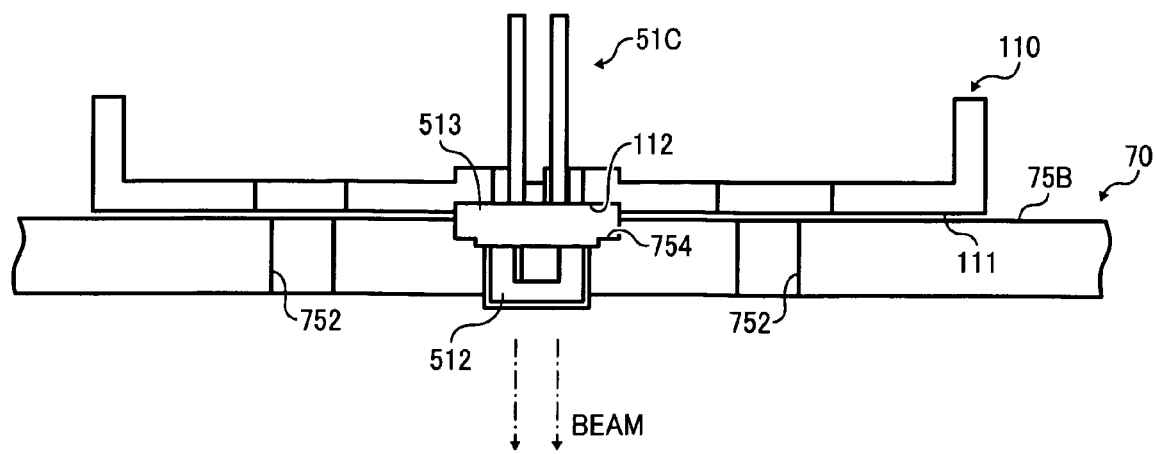
FIG. 9 is a schematic sectional view (according to an example embodiment) of the LDA before attachment to the first case.
Figure 10:
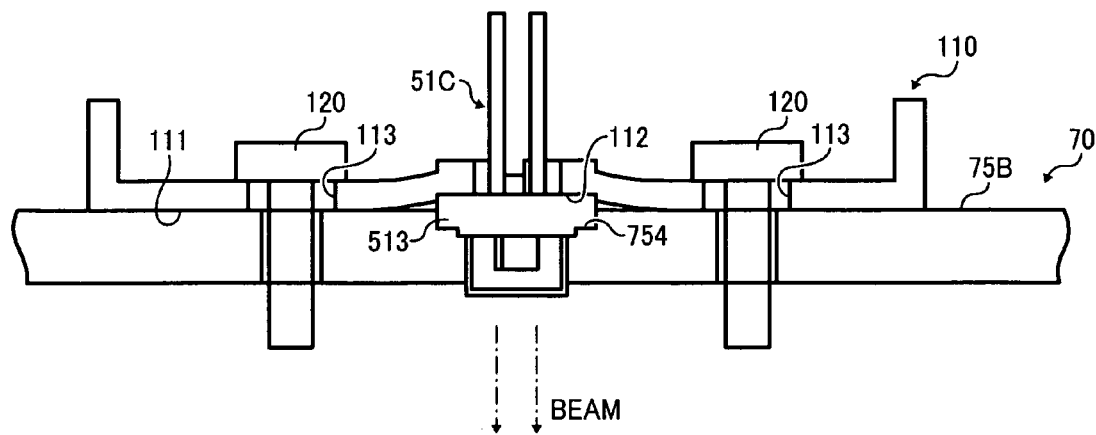
FIG. 10 is a schematic sectional view (according to an example embodiment) of the LDA when attached to the first case.

FIG. 9 is a sectional view of the LDA 51C before attachment to the first case 70, and FIG. 10 is a sectional view of the LDA 51C when attached to the first case 70. As illustrated in FIG. 10, the optical scanner 4 further includes springs 120.

When the light-emitter 512 is inserted into the light-emitter receiver 753 depicted in FIG. 7, and the base 513 is inserted into the base receiver 755 depicted in FIG. 7, the reference plane 513A depicted in FIG. 7 contacts the positioning surface 754, so that the LDA 51C is positioned in the first case 70 in the axial direction of the LDA 51C. In addition, since the light-emitting receiver 753 has a diameter slightly greater than that of the light-emitter 512 of the LDA 51C, and the base receiver 755 has a diameter slightly greater than that of the base 513 of the LDA 51C, the LDA 51C inserted into the light source mounting hole 76C depicted in FIG. 7 is rotatable.

When the feeding member 511 of the LDA 51C penetrates the through-hole 114 of the pressing member 110, the pressing surface 112 contacts the surface of the base 513 opposite to the reference plane 513A. Since the pressing surface 112 is farther from the light source mounting surface 75B in the axial direction of the LDA 51C than the mounting surface 111, that is, the pressing surface 112 is recessed into the mounting surface 111, when the base 513 fits loosely into the pressing surface 112, the pressing surface 112 can properly contact the surface of the base 513 opposite to the reference plane 513A.

When the LDA 51C is positioned on the positioning surface 754, one part of the base 513 protrudes from the light source mounting surface 75B, as illustrated in FIG. 9. Thus, when the pressing surface 112 of the pressing member 110 contacts the surface of the base 513 opposite to the reference plane 513A, a gap is generated between the mounting surface 111 and the light source mounting surface 75B, as illustrated in FIG. 9.

As illustrated in FIG. 10, when the screw 120, serving as a mounting member, is inserted into the screw hole 113 and screwed into the screw hole 752 of the light source mounting surface 75B to fasten the pressing member 110 to the first case 70 until the mounting surface 111 of the pressing member 110 contacts the light source mounting surface 75B, elastic deformation occurs around the pressing surface 112. Therefore, the pressing surface 112 is supplied with a force of restitution that presses the LDA 51C toward the positioning surface 754 in the axial direction of the LDA 51C. As a result, the base 513 of the LDA 51C is sandwiched between the pressing surface 112 and the positioning surface 754, so that the LDA 51C is installed in the first case 70.

According to this example embodiment, since the mounting surface 111 of the pressing member 110 is parallel to the pressing surface 112, when the pressing member 110 is fastened to the light source mounting surface 75B with the screw 120, a pressing force generated by the screw 120 is applied to the pressing member 110 to press the LDA 51C. As a result, mere mounting of the pressing member 110 to the light source mounting surface 75B generates the pressing force acting on the LDA 51C. Therefore, no complicated structure for application of the pressing force to the LDA 51C is necessary, enabling the optical writing unit 4 to be provided at low cost.

More specifically, according to this example embodiment, since a vertical position of the pressing surface 112 is different from that of the mounting surface 111 in the axial direction of the LDA 51C, the LDA 51C is properly supplied with the pressing force in the axial direction of the LDA 51C, thereby increasing the force to press the LDA 51C in the axial direction of the LDA 51C.

If the pressing surface 112 and the mounting surface 111 are in the same plane, when the pressing member 110 is fixed to the mounting surface 75B to elastically deform the periphery of the pressing surface 112, one portion of the pressing surface 112 may separate from the base 513. As a result, the LDA 51C is pressed obliquely to the axial direction of the LDA 51C, thereby decreasing the pressing force acting on the LDA 51C in the axial direction of the LDA 51C.

However, according to this example embodiment, since the vertical position of the pressing surface 112 is different from that of the mounting surface 111 in the axial direction of the LDA 51C, when the pressing member 110 is fixed to the mounting surface 75B to elastically deform the periphery of the pressing surface 112, a connection portion of the pressing surface 112 and the mounting surface 111 is also elastically deformed, as illustrated in FIG. 10, thereby preventing the pressing surface 112 from separating from the reference plane 513A of the base 513. As a result, the LDA 51C can be pressed in the axial direction of the LDA 51C. Since the connection portion of the pressing surface 112 and the mounting surface 111 is elastically deformed, a force of restitution generated in the connection portion is also applied to the pressing surface 112, thereby increasing the pressing force acting on the LDA 51C in the axial direction of the LDA 51C.

Figure 11:
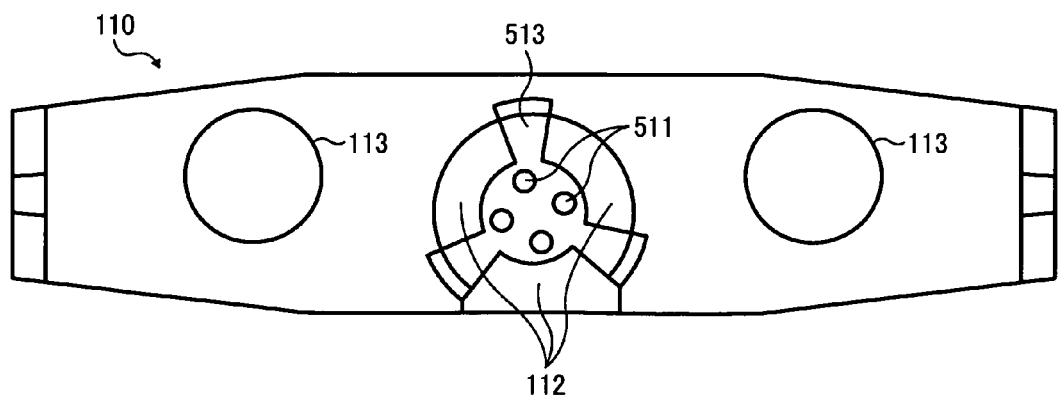
FIG. 11 is a schematic top view (according to an example embodiment) of the pressing member and the LDA shown in FIG. 10.

FIG. 11 is a top view of the pressing member 110 fastened to the first case 70. If a single annular pressing surface is provided in the pressing member 110, a pressing force may be unequally applied to the LDA 51C due to uneven flatness of the pressing surface, so that the pressing member 110 cannot properly support the LDA 51C. However, according to this example embodiment, three pressing surfaces 112 are circumferentially provided in the same plane, equally separated from each other to press the LDA 51C, so that the LDA 51C can be pressed at three points, thereby equalizing the pressure on the LDA 51C. In addition, compared to the single circular pressing surface, each pressing surface 112 can be more easily given a greater degree of flatness. It is to be noted that although the pressing member 110 includes three pressing surfaces 112, the number of the pressing surfaces 112 is not limited to three, but may be two.

In addition, since each pressing surface 112 has the same shape as any other, a contact area of each pressing surface 112 and the LDA 51C is the same as well, thereby equalizing pressure on the LDA 51C, so that the LDA 51C is properly supported by the first case 70.

According to this example embodiment, the optical writing unit 4 uses a multi-beam scanning method for scanning each surface of the photoconductors 10Y, 10C, 10M, and 10K depicted in FIG. 1 using the LDAs 51A, 51B, 51C, and 51D depicted in FIG. 4 simultaneously directing a plurality of beams to the photoconductors 10Y, 10C, 10M, and 10K, respectively. However, when each light-emitting point of the LDA 51C deviates from an intended position, a beam pitch differs from a desired pitch, thereby forming an image smaller or larger than the actual size.

When the LDA 51C is fixed by a press-fitting method used in a known optical scanner, in order to adjust a beam pitch, the LDA 51C needs to be attached to a light source unit separated from the first case 70 and rotating relative to the first case 70, thereby increasing the number of components and costs.

However, according to this example embodiment, the light-emitter receiver 753 has a diameter slightly greater than that of the light-emitter 512 of the LDA 51C, and the base receiver 755 has a diameter slightly greater than that of the base 513, so that the LDA 51C can rotate in the light source mounting hole 76C. In addition, the LDA 51C is fixed to the first case 70 merely by being sandwiched between the positioning surface 754 and the pressing surface 112 of the pressing member 110 in the axial direction of the LDA 51C. Therefore, when the screw 120 depicted in FIG. 10 is loosened to weaken a force holding the LDA 51C, the LDA 51C can rotate in the light source mounting hole 76C. Therefore, when each light-emitting point of the LDA 51C deviates from an intended position to cause a beam pitch to be different from a desired pitch, the screw 120 is loosened to weaken the force holding the LDA 51C and the LDA 51C can be rotated in the light source mounting hole 76C, so that the beam pitch can be easily adjusted. Alternatively, the LDA 51C may be directly attached to the first case 70, so that the beam pitch can be adjusted, thereby reducing the number of components and the cost of the optical writing unit 4.

In addition, according to this example embodiment, the pressing member 110 presses a surface of the LDA 51C opposite to a light emitting side of the LDA 51C, thereby facilitating attachment and removal of the LDA 51C.

If the positioning surface 754 of the first case 70 contacts a surface of the base 513 on a side of the feeding member 511 while the pressing member 110 presses the opposite surface of the base 513, the LDA 51C is inserted into the light source mounting hole 76C from the inside of the first case 70, and the pressing member 110 is fastened to the first case 70 from the inside of the first case 70. Therefore, when the LDA 51C is inserted into the light source mounting hole 76C, for example, an edge of the feeding portion 111 may contact a lens provided in the first case 70 and damage the lens. Similarly, in attachment of the pressing member 110, the pressing member 110, and the screw 120, a driver used for attachment of the pressing member 110 or the like may damage the lens. In addition, the LDA 51C needs to be carefully attached to the first case 70 in order not to damage components such as the lens of the first case 70, thereby decreasing the efficiency of attachment of the LDA 51C. In handling the driver turning the screw 120, the components of the first case 70 may disturb attachment of the LDA 51C and complicate adjustment of the beam pitch.

However, according to this example embodiment, the positioning surface 754 contacts the surface of the base 513 on the side of the light-emitter 512, and the pressing portion 110 contacts the surface of the base 513 on the side of the feeding member 511, the LDA 51C and the pressing portion 110 can be attached to the first case 70 from the outside of the first case 70, thereby preventing damage to the components such as the lens provided in the first case 70. In addition, when a driver is used for turning the screw 120, the components of the first case 70 do not disturb attachment of the LDA 51C, thereby facilitating adjustment of the beam pitch.

Alternatively, however, if for some reason the LDA 51C and the pressing portion 110 cannot be attached to the first case 70 from the outside of the first case 70, the positioning surface 754 of the first case 70 may contact the surface of the base 513 of the LDA 51C on the side of the feeding member 511, while the pressing portion 110 may contact the surface of the base 513 on the side of the light-emitter 512.

Since the pressing member 110 is fastened to the first case 70 with the screw 120, as illustrated in FIG. 10, attachment and removal of the pressing member 110 is easier than in the case in which an adhesive or the like is used for fixing the pressing member 110, thereby facilitating replacement of the LDA 51C. Moreover, merely loosening the screw 120 can reduce a pressing force of the pressing member 110 acting on the LDA 51C, thereby facilitating rotation the LDA 51C.

Therefore, after rotation of the LDA 51C held by the first case 70, the beam pitch and the shape of the light beam emitted from the LDA 51C can be easily adjusted.

Figure 12:
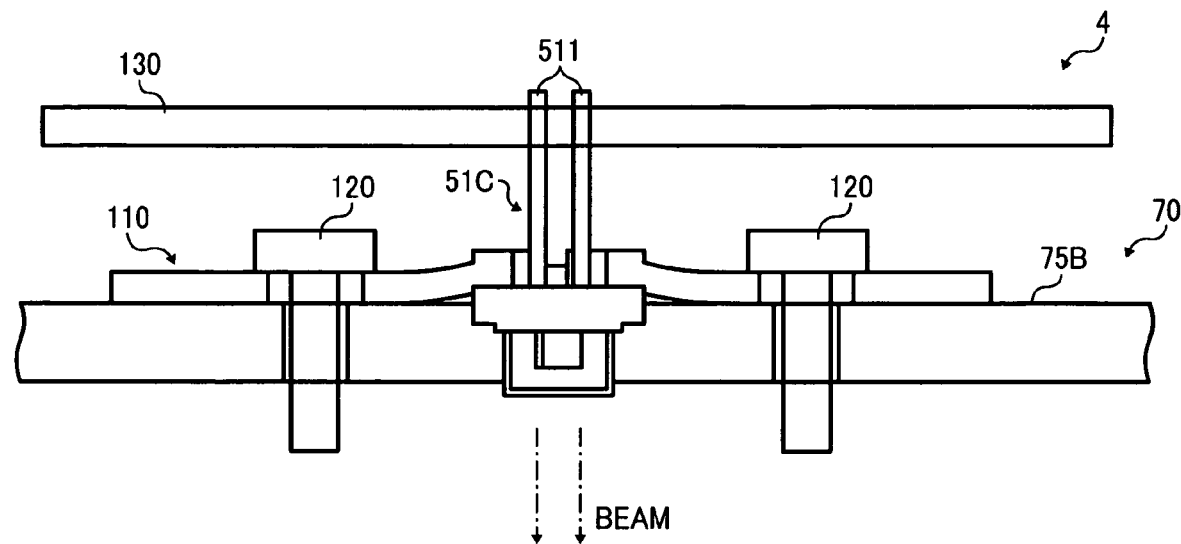
FIG. 12 is a schematic sectional view (according to an example embodiment) of a control board attached to the LDA shown in FIG. 10.

FIG. 12 is another schematic sectional view of the LDA 51C attached to the first case 70. As can be seen in FIG. 12, the optical writing unit 4 further includes a control board 130. When the LDA 51C is fixed to the first case 70, the control board 130 controlling the LDA 51C is attached to the feeding member 511 with a screw. Therefore, the pressing member 110 is provided in a narrow gap between the LDA 51C and the control board 130. Thus, when the first case 70 is installed in the second case 60, as illustrated in FIG. 6, the control board 130 can protect the pressing member 110 from damage caused by hitting another member, thereby preventing rotation of the LDA 51C due to a weakening of the force holding the LDA 51C or generation of an uneven pressing force applied to the LDA 51C. As a result, the light-emitting point of the LDA 51C can be prevented from deviating from a predetermined position, thereby preventing the beam pitch from having to be adjusted again.

Alternatively, the control board 130 may include a through-hole through which a driver penetrates, provided at a position opposite the screw 120 fastening the pressing member 110, so that the driver can easily turn the screw 120. Thus, a user can easily adjust the beam pitch by loosening the screw 120 and easily remove the pressing member 110 to replace the LDA 51C.

Figure 13:
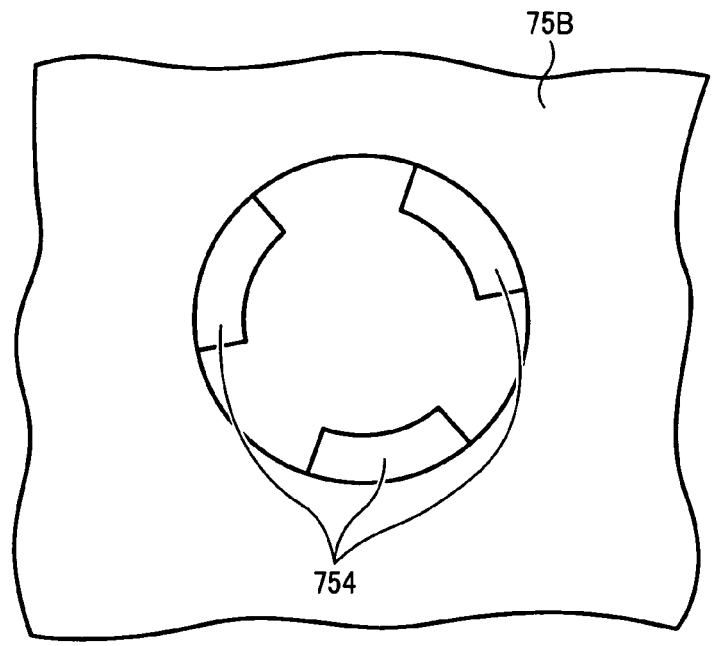
FIG. 13 is a partial plan view (according to an example embodiment) of a light source mounting surface included in the first case shown in FIG. 10.

FIG. 13 is a partial plan view of the light source mounting surface 75B according to this example embodiment. Three positioning surfaces 754 are circumferentially provided in the same plane to properly position the LDA 51C. If an annular positioning surface is provided in the first case 70, a pressing force may be unequally applied to the LDA 51C due to uneven flatness of the positioning surface, so that the LDA 51C may be inclined from a predetermined position. However, according to this example embodiment, since three positioning surfaces 754 are circumferentially provided in the light source mounting surface 75B, equally separated from each other, the LDA 51C can be properly supported at three points. In addition, the positioning surface 754 has a smaller surface area than the single annular positioning surface, and therefore each positioning surface 754 can easily be given an increased degree of flatness. As a result, the positioning surface 754 can properly define a position of the LDA 51C. It is to be noted that the number of the positioning surfaces 754 is not limited to three, but may be two.

Figure 14:
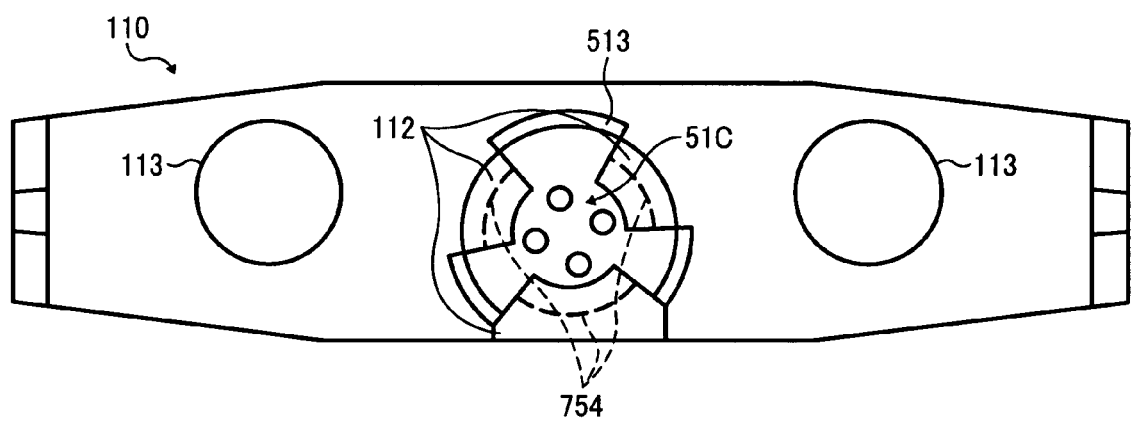
FIG. 14 is a schematic top view (according to an example embodiment) of the pressing member and the LDA shown in FIG. 11.

FIG. 14 is a top view of the pressing member 110 fastened to the first case 70. The number of the positioning surfaces 754 is equal to the number of the pressing surfaces 112. Each positioning surface 754, indicated by dotted lines, opposes the pressing surface 112 across the base 513 of the LDA 51C. Therefore, the positioning surface 754 can receive the pressing force of the pressing surface 112 in the axial direction of the LDA 51C, thereby properly holding and fixing the LDA 51C.

In addition, the pressing member 110 is made of an insulating material such as resin or the like. Since the feeding member 511 of the LDA 51C penetrates the pressing member 110, for example, when a user loosens the screw 120 to adjust the beam pitch or the amount of light emitted by the LDA 51C, the user's hands may hit the pressing member 110 to cause the feeding member 511 to contact an inner circumferential surface of the through-hole 114 (a surface of the pressing surface 112 opposing the feeding member 511). Therefore, if the pressing member 110 is made of a conductive material, an electrical current may leak from the feeding member 511. When the base 513 is not a ground level, if the pressing member 110 is made of a conductive material, an electrical current may leak to the pressing surface 112. In addition, when the gap between the control board 130 depicted in FIG. 12 and the pressing member 110 is too narrow, the control board 130 may partially contact the pressing member 110. Thus, the use of a conductive material for the pressing member 110 may cause leakage of an electrical current to the pressing member 110. Therefore, the pressing member 110 is made of an insulating material, thereby preventing leakage of an electrical current to the pressing member 110.

Figure 15:
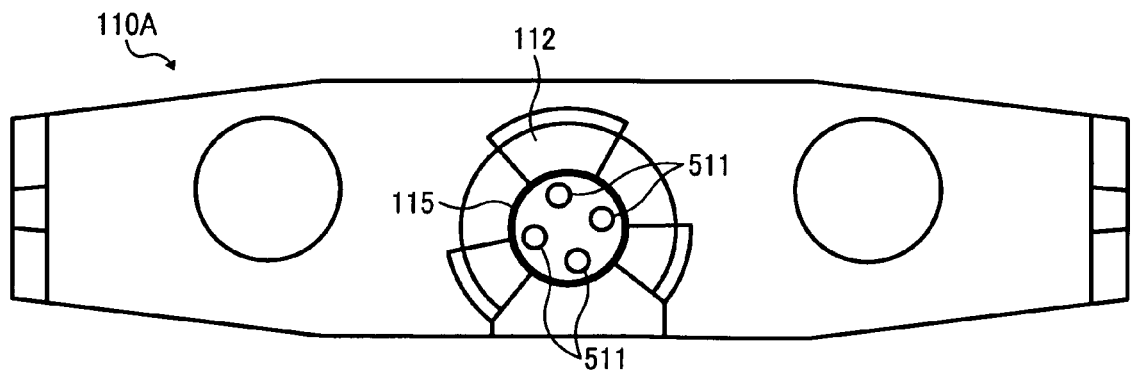
FIG. 15 is a schematic top view of a pressing member according to another example embodiment of the present invention.

FIG. 15 is a schematic top view of a pressing member 110A. The pressing member 110A includes the pressing surface 112 and an insulating member 115. The insulating member 115 is made of rubber or the like, and provided between the pressing surface 112 and the base 513, or between the feeding member 511 and the inner circumferential surface of the through-hole 114 (the surface of the pressing surface 112 opposing the feeding member 511). When the pressing member 110A needs to be a conductive material such as aluminum, iron, or the like, provision of the insulating member 115 is effective in order to obtain a pressing force necessary for holding the LDA 51C. Alternatively, an insulating material may be applied to the pressing surface 112 or the inner circumferential surface of the through-hole 114 (the surface of the pressing surface 112 opposing the feeding member 511).

When the base 513 of the LDA 51C is a ground level, the insulating member 115 is provided between the feeding member 511 and the inner circumferential surface of the through-hole 114 (the surface of the pressing surface 112 opposing the feeding member 511). Alternatively, an insulating material may be applied to the inner circumferential surface of the through-hole 114 opposing the feeding member 511 (the surface of the pressing surface 112 opposing the feeding member 511).

Alternatively, when the control board 130 depicted in FIG. 12 is attached to the feeding member 511, an insulating material may be applied to a portion of the pressing member 110A that is likely to contact the feeding member 511, or an insulating member such as rubber or the like may be attached thereto.

Accordingly, the pressing member 110A can obtain a pressing force and an electrical insulation property necessary for holding the LDA 51C.

Figure 16:
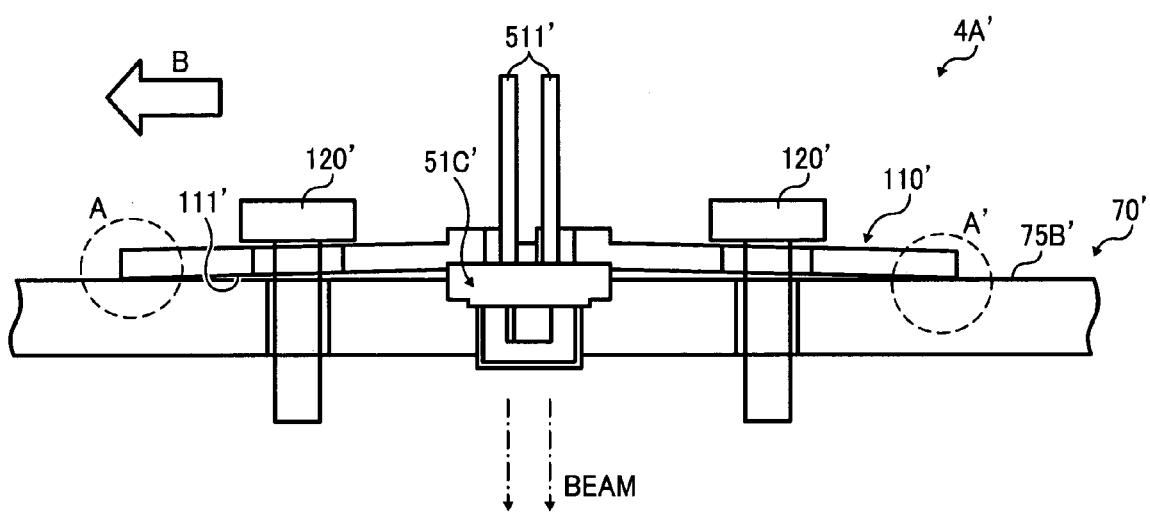
FIG. 16 is a schematic sectional view of a conventional optical writing unit.
Figure 17:
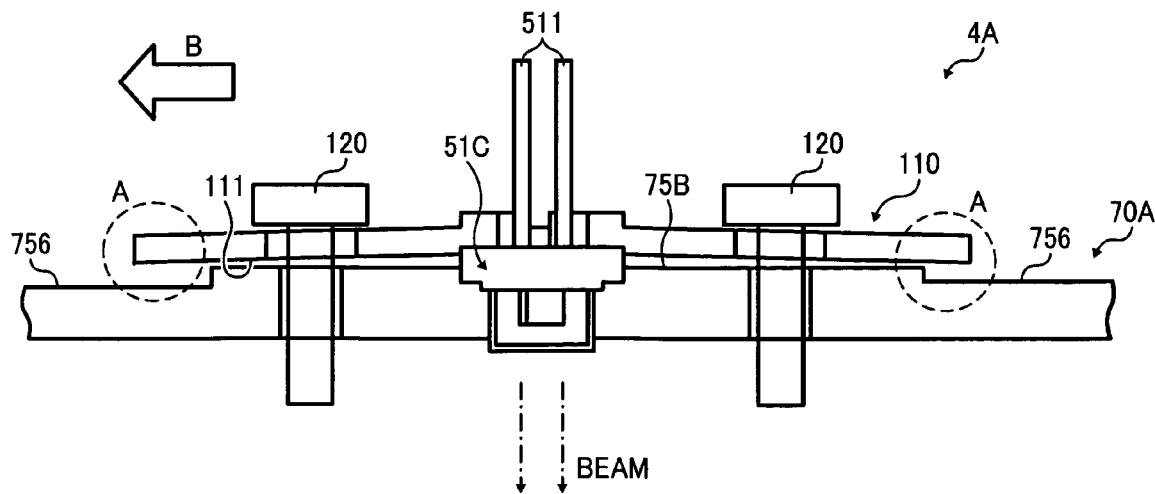
FIG. 17 is a schematic sectional view of an optical writing unit according to yet another example embodiment of the present invention.

Referring to FIGS. 16 and 17, a description is now given of an optical writing unit 4A' according to another example embodiment. FIG. 16 is a schematic sectional view of an optical writing unit 4A'. FIG. 17 is a schematic sectional view of the optical writing unit 4A.

As illustrated in FIG. 16, when a pressing member 110' is fastened to a first case 70' with a screw 120', a central portion of a pressing member 110' in a longitudinal direction of the pressing member 110' separates from a light source mounting surface 75B'. Therefore, a mounting surface 111' is curved, with an outermost edge A' of the mounting surface 111' in a longitudinal direction of the mounting surface 111' closest to the light source mounting surface 75B'. When the screw 120' is further tightened into the first case 70' such that the mounting surface 111' of the pressing member 110 contacts the light source mounting surface 75B', the outermost edge A' of the mounting surface 111' in the longitudinal direction thereof contacts the light source mounting surface 75B' at an angle with the light source mounting surface 75B', so that the pressing member 110 is not formed into a desired shape. As a result, a LDA 51C' may not be pressed at a desired uniform pressure. In particular, when a torque-managed driver is used to turn the screw 120', the pressing member 110' may not be formed into a desired shape, so that the LDA 51C' may not be pressed at a desired uniform pressure.

Moreover, since the outermost edge A' of the mounting surface 111' in the longitudinal direction thereof may scrape the light source mounting surface 75B to generate a fragment of the mounting surface 111' adhering to a mirror, lens, or the like, provided in the optical writing unit 4A', causing an abnormal image, or when such fragment adheres to a feeding member 511' of the LDA 51C', electrical failure may occur in the LDA 51C'.

However, as illustrated in FIG. 17, the optical writing unit 4A includes a first case 70A including a recessed portion 756. The recessed portion 756 is provided on the light source mounting surface 75B opposing an outermost edge A of the mounting surface 111, so that the outermost edge A of the mounting surface 111 separates from the light source mounting surface 75B.

Provision of the recessed portion 756 prevents the outermost edge A of the mounting surface 111 from being scraped against the light source mounting surface 75B when the pressing member 110 is fastened to the first case 70 with the screw 120, thereby preventing the outermost edge A of the mounting surface 111 from contacting the light source mounting surface 75B. As a result, the pressing member 110 is properly formed into a shape such that the mounting surface 111 conforms to the light source mounting surface 75B, so that the pressing member 110 can press the LDA 51C at a desired uniform pressure. Moreover, the outermost edge A of the mounting surface 111 does not scrape the light source mounting surface 75B, thereby preventing a faulty image or an electrical failure due to adhesion of a fragment of the light source mounting surface 75B scraped by the outermost edge A of the mounting surface 111 to the feeding member 511 of the LDA 51C.

Figure 18:
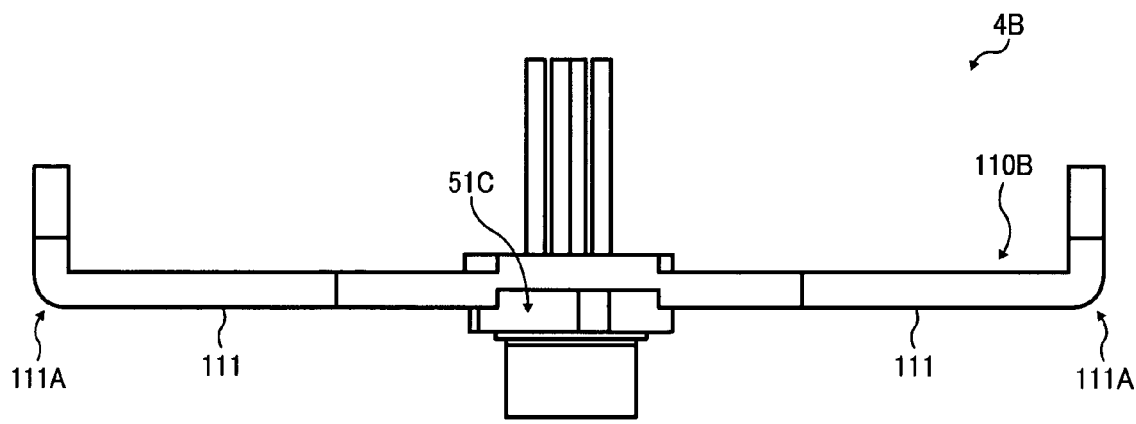
FIG. 18 is a sectional view of a pressing member according to yet another example embodiment of the present invention.

FIG. 18 is a schematic sectional view of an optical writing unit 4B. A pressing member 110B of the optical writing unit 4B includes the mounting surface 111 including a curved edge 111A. The curved edge 111A is provided at an outermost edge of the mounting surface 111 in a longitudinal direction of the mounting surface 111. Thus, even when the outermost edge of the mounting surface 111 contacts the light source mounting surface 75B, the outermost edge of the mounting surface 111 does not scrape the light source mounting surface 75B. Therefore, the pressing member 110B is properly formed into a shape such that the mounting surface 111 conforms to the light source mounting surface 75B, thereby pressing the LDA 51C at a desired uniform pressure. In addition, the outermost edge of the mounting surface 111 does not scrape the light source mounting surface 75B, thereby preventing a faulty image or an electrical failure due to adhesion of a fragment of the light source mounting surface 75B scraped by the outermost edge of the mounting surface 111 to the feeding member 511 of the LDA 51C.

Alternatively, the pressing member 110B may include a member with a decreased frictional coefficient provided at the outermost edge of the mounting surface 111 or a portion of the light source mounting surface 75B contacting the outermost edge of the mounting surface 111, preventing the outermost edge of the mounting surface 111 from scraping the light source mounting surface 75B.

Figure 19:
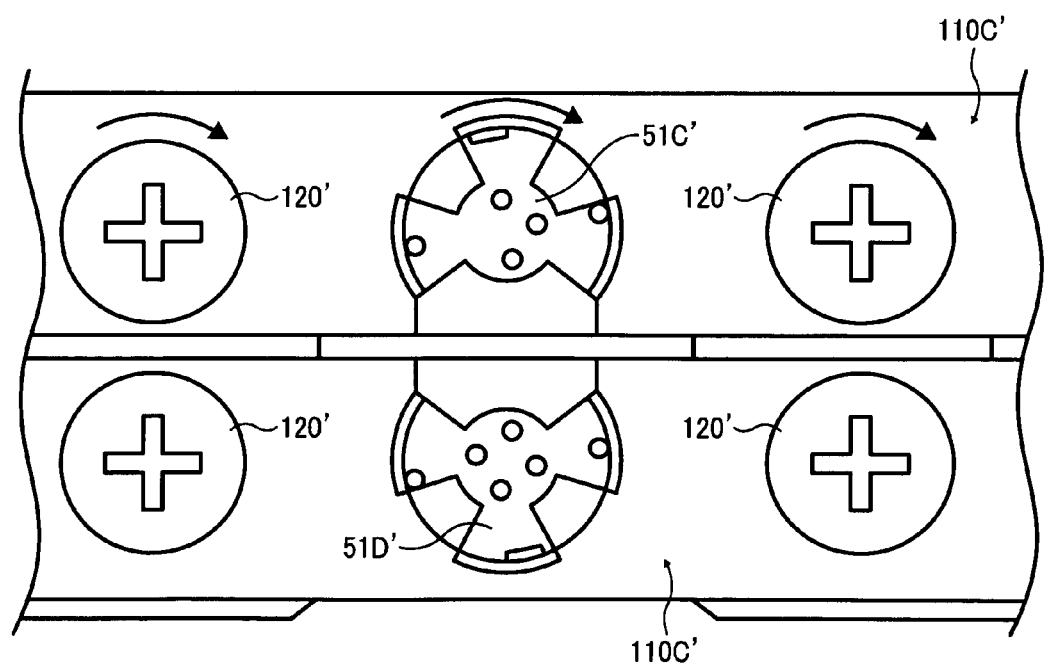
FIG. 19 is a schematic plan view of a conventional optical writing unit.
Figure 20:
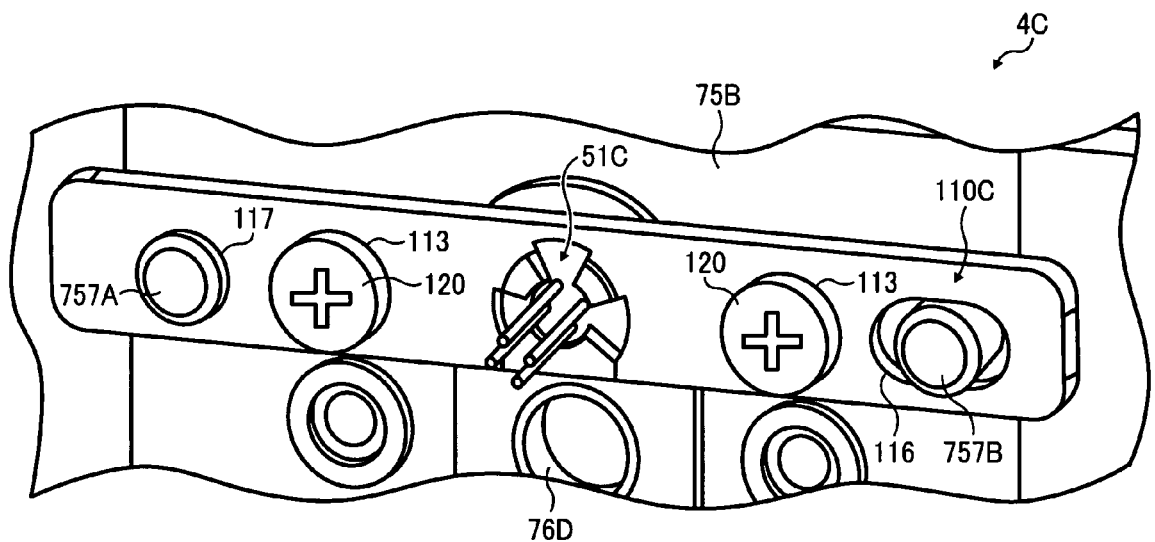
FIG. 20 is a schematic perspective view of an optical writing unit according to yet another example embodiment of the present invention.

Referring to FIGS. 19 and 20, a description is now given of an optical writing unit 4C according to yet another example embodiment. FIG. 19 is a schematic plan view of a pressing member 110C'. FIG. 20 is a schematic perspective view of the optical writing unit 4C.

As illustrated in FIG. 19, the pressing member 110C' is fastened with the screw 120' to generate a force in a rotational direction as indicated by arrows to slightly rotate the pressing member 110C' in the rotational direction. Due to rotation of the pressing member 110C', the LDA 51C' pressed by the pressing member 110C' rotates to cause a variation in beam pitch.

As illustrated in FIG. 20, the optical writing unit 4C includes a pressing member 110C. The pressing member 100C includes a first convex portion 757A, a second convex portion 757B, an elongated hole 116, and a circular hole 117. The first convex portion 757A and the second convex portion 757B have a columnar shape, and extend from the light source mounting surface 75B. The elongated hole 116 is provided in the pressing member 110C to engage the second convex portion 757B, and the circular hole 117 is provided in the pressing member 110C to engage the first convex portion 757A. The first convex portion 757A, the second convex portion 757B, the elongated hole 116, and the circular hole 117, together serving as a pressing member positioning assembly, define a position of the pressing member 110C in a rotational direction thereof before the pressing member 110C is fixed to the first case 70.

The elongated hole 116 and the circular hole 117, serving as engaging holes, are provided outboard of the screw hole 113 in the longitudinal direction of the pressing member 110C. Each length of the elongated hole 116 and the circular hole 117 in a lateral direction of the pressing member 110C is substantially equal to each diameter of the first convex portion 757A and the second convex portion 757B, so that the elongated hole 116 and the circular hole 117 can firmly engage the first convex portion 757A and the second convex portion 757B in the lateral direction of the pressing member 110C, respectively. Therefore, the pressing member 110C is positioned in a rotational direction, so that the pressing member 110C does not rotate due to a force in a rotational direction applied to the pressing member 110C when the pressing member 110C is fixed to the first case 70 with the screw 120. As a result, the LDA 51C does not rotate when the pressing member 110C is fixed to the first case 70, thereby enabling a desired beam pitch to be obtained.

In addition, the circular hole 117 engages the first convex portion 757A, thereby properly positioning the LDA 51C in a direction vertical to the light axis of the LDA 51C, as well as in the rotational direction.

Since the pressing member 100C rotates around the screw 120, the smaller a distance between the fastening position of the screw 120 and the LDA 51C, the smaller the rotational force acts on the LDA 51C. In addition, when there are greater distances between the elongated hole 116 engaging the second convex portion 757B and the screw 120 and between the circular hole 117 engaging the first convex portion 757A and the screw 120, the amount of rotation of the pressing member 110C can be reduced when gaps are generated between the elongated hole 116 and the second convex portion 757B and between the circular hole 117 and the first convex portion 757A in the lateral directions, respectively.

Therefore, since the elongated hole 116 and the circular hole 117 are provided outboard of the screw hole 113 in the longitudinal direction of the pressing member 110C, the screw 120 is close to the pressing position of the LDA 51C, thereby decreasing the rotational force acting on the LDA 51C. In addition, since the position of the elongated hole 116 engaging the second convex portion 757B separates from the screw 120 adjacent to the circular hole 117, even when the pressing member 110C rotates around the screw 120 adjacent to the circular hole 117, the pressing member 110C can be prevented from moving in the rotational direction thereof. Similarly, since the position of the circular hole 117 engaging the first convex portion 757A separates from the screw 120 adjacent to the elongated hole 116, even when the pressing member 110C rotates around the screw 120 adjacent to the elongated hole 116, the pressing member 110C can be prevented from moving in the rotational direction thereof.

Figure 21:
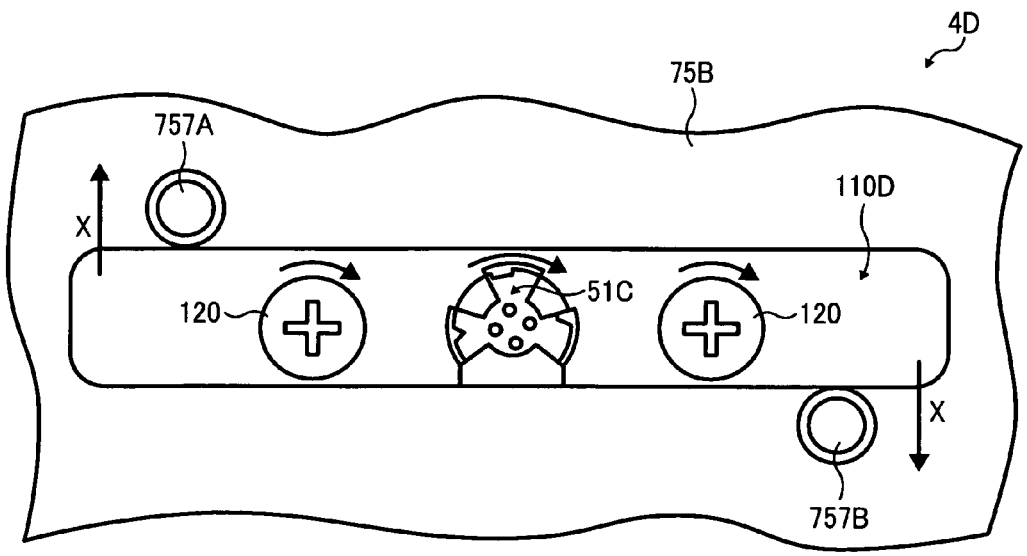
FIG. 21 is a schematic plane view of an optical writing unit according to yet another example embodiment of the present invention.

Referring to FIG. 21, a description is given of a pressing member 110D according to yet another example embodiment. The pressing member 110D does not include the elongated hole 116 and the circular hole 117. The first convex portion 757A contacts an upper edge surface of the pressing member 110D, and the second convex portion 757B contacts a lower edge surface of the pressing member 100D. The first convex portion 757A and the second convex portion 757B are provided outboard of the screw 120 in a longitudinal direction of the pressing member 110D. More specifically, the first convex portion 757A is provided in a position other than the central portion of the upper edge surface of the pressing member 110D extending in a longitudinal direction of the pressing member 110D, and the second convex portion 757B is provided in a position other than the central portion of the lower edge surface of the pressing member 110D extending in a longitudinal direction thereof.

Whether the first convex portion 757A contacts the upper edge surface or the lower edge surface of the pressing member 110D is determined based on a rotational direction of the pressing member 110D when fastened to the light source mounting surface 75B with the screw 120. It is to be noted that a vertical distance between a lower end of the first convex portion 757A and an upper end of the second convex portion 757B is substantially equal to a length of the pressing member 110D in a lateral direction thereof.

Therefore, provisions of the first and the second convex portions 757A and 757B prevent rotation of the pressing member 110D in directions X, thereby preventing generation of a rotational force applied to the LDA 51C when the screw 120 is tightened to fasten the pressing member 110D. In addition, since each of the convex portions 757A and 757B is provided outboard of the screw 120, the fastening position of the screw 120 is close to the pressing position of the LDA 51C, thereby inhibiting generation of the rotational force acting on the LDA 51C when the screw 120 is tightened to fasten the pressing member 110D.

Alternatively, the pressing member 110D may include a groove provided on the upper edge surface of the pressing member 110D contacting the first convex portion 757A to engage the first convex portion 757A and on the lower edge surface of the pressing member 110D contacting the second convex portion 757B to engage the second convex portion 757B, respectively.

Figure 22:
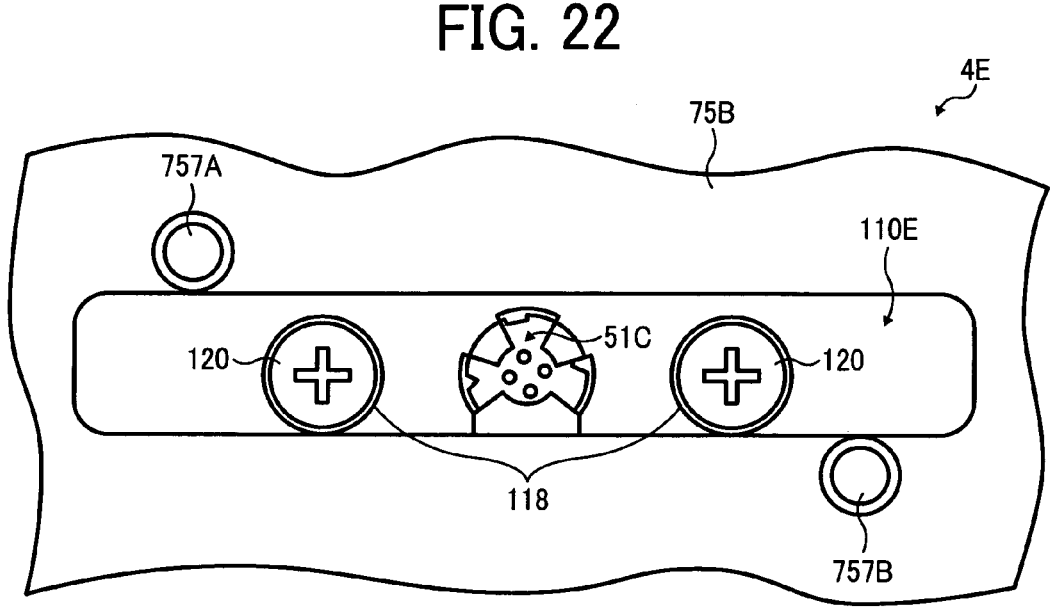
FIG. 22 is a schematic plane view of an optical writing unit according to yet another example embodiment of the present invention.

Referring to FIG. 22, a description is given of an optical writing unit 4E according to yet another example embodiment. The optical writing unit 4E includes a pressing member 110E including a slide member 118. The slide member 118 is provided between a head of the screw 120 and the pressing member 110E, and slides between the head of the screw 120 and the pressing member 110E when the screw 120 is tightened, thereby preventing transmission of the rotational force of the screw 120 to the pressing member 110E, so that the pressing member 110E is properly supplied with a force in the axial direction of the LDA 51C. Therefore, the pressing member 110E is fixed to the first case 70 to prevent rotation of the LDA 51C, so that the LDA 51C can obtain a desired beam pitch.

The slide member 118 has a small coefficient of friction with the head of the screw 120 and is a flat washer, for example. Provision of the slide member 118 with a small frictional coefficient properly generates a sliding force between the head of the screw 120 and the slide member 118, thereby reducing the rotational force applied to the slide member 118 to prevent the pressing member 110E from slightly rotating.

In addition, since the slide member 118 has a small coefficient of friction with the pressing member 110E, a sliding force is generated between the pressing member 110E and the slide member 118, thereby preventing transmission of the rotational force to the pressing member 110E. As a result, the LDA 51C fixed by the pressing member 110E can be properly kept in an original position, thereby obtaining a desired optical property.

Figure 23:
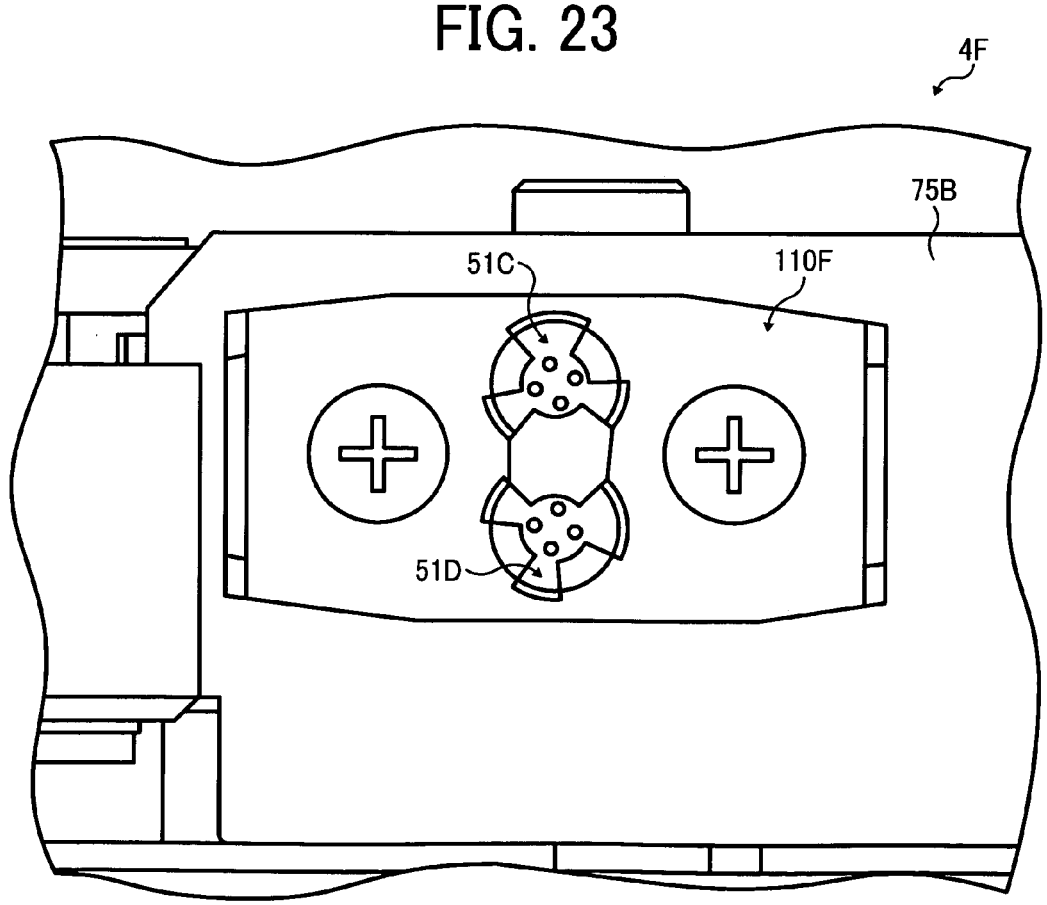
FIG. 23 is a schematic view of an optical writing unit according to yet another example embodiment of the present invention.

Referring to FIG. 23, a description is given of an optical writing unit 4F according to yet another example embodiment. FIG. 23 is a schematic plan view thereof. The optical writing unit 4F includes a pressing member 110F. The pressing member 110F supports both the LDA 51C inserted into the light source mounting hole 76C and the LDA 51D inserted into the light source mounting hole 76D provided immediately below the light source mounting hole 76C. Similarly, although not shown in FIG. 23, the pressing member 110F supports both the LDA 51A inserted into the light source mounting hole 76A and the LDA 51B inserted into the light source mounting hole 76D provided immediately below the light source mounting hole 76B.

Since the pressing member 110F supports the plurality of LDAs, the number of components and costs of the optical writing unit 4F can be reduced, as can the amount of assembly work, thereby reducing manufacturing costs.

Figure 24:
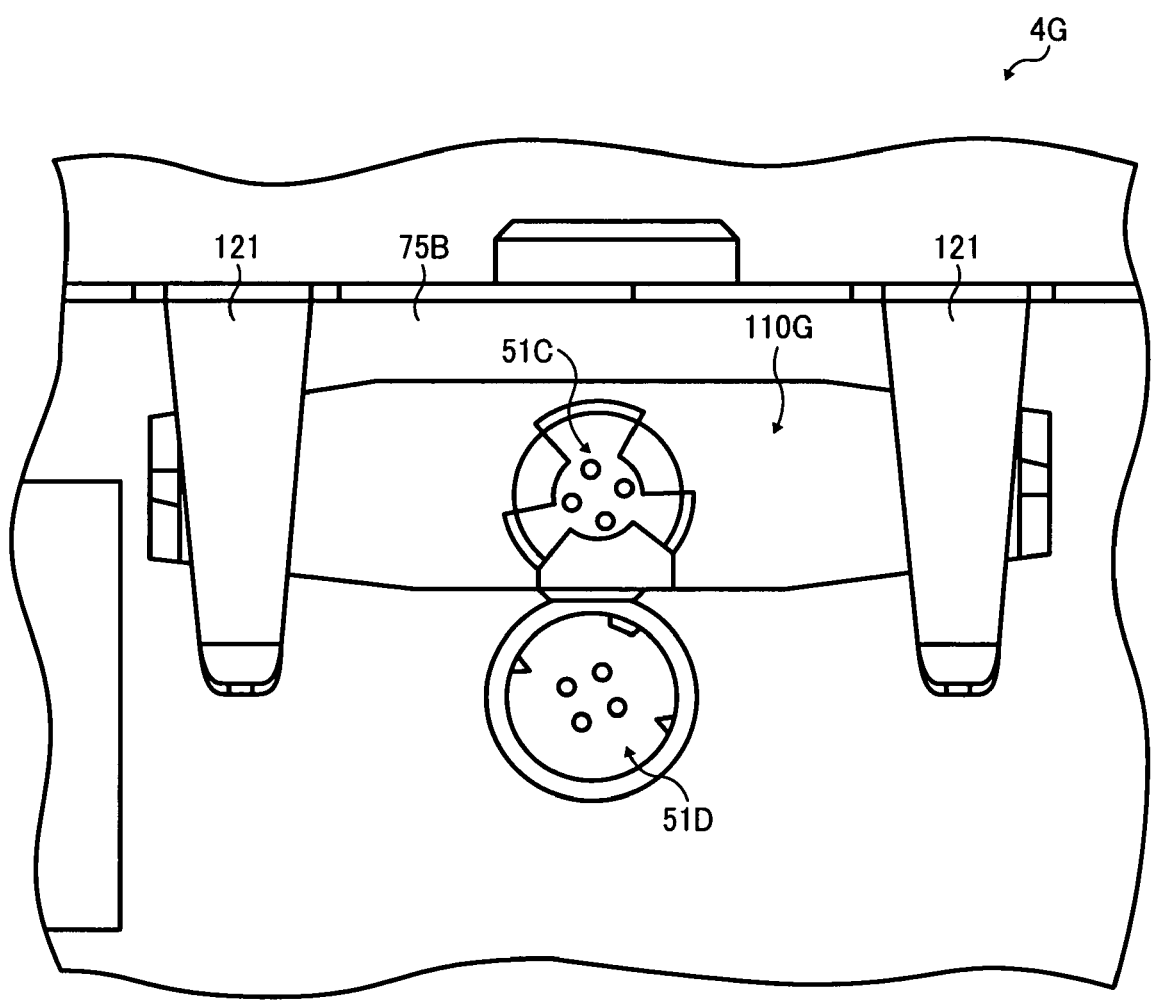
FIG. 24 is a schematic view of an optical writing unit according to yet another example embodiment of the present invention.

Referring to FIG. 24, a description is given of an optical writing unit 4G according to yet another example embodiment. FIG. 24 is a schematic top view of thereof. The optical writing unit 4G includes a pressing member 110G including springs 121. Although the screw 120 is used to fasten the pressing members 110, 110A, 110B, 110C, 110D, 110E, and 110F, according to the above-described example embodiments, the pressing member 110G is fastened to the light source mounting surface 75B with the springs 121, serving as mounting members. Due to a pressing force of the springs 121, the pressing member 110G is formed into a shape such that the mounting surface 111 depicted in FIG. 10 conforms to the light source mounting surface 75B, that is, the mounting surface 111 around the pressing surface 112 depicted in FIG. 10 of the pressing member 110G is elastically deformed. Therefore, the pressing surface 112 can properly presses the LDA 51C to hold the LDA 51C by being sandwiched between the positioning surface 754 and the pressing surface 112, as illustrated in FIG. 10. The pressing member 110G is removed merely reducing the pressing force of the springs 121 applied to the pressing member 110, so that the optical writing unit 4 can facilitate replacement of the LDA 51C, compared to a conventional optical scanner in which a pressing member is fixed with an adhesive. In addition, when the pressing force of the springs 121 is reduced to weaken a force the pressing member 110G pressing the LDA 51C, the LDA 51C can rotate. Therefore, while the LDA 51C is held by the first case 70, adjustments of the beam pitch and the shape of the light beam emitted from the LDA 51C are possible.

In order to adjust a beam pitch, the pressing member 110G may include a cushion provided between the light source mounting surface 75B and the spring 121 to decrease the pressing force applied to the pressing member 110G, thereby reducing a force holding the LDA 51C to easily rotate the LDA 51C.

Figure 25:
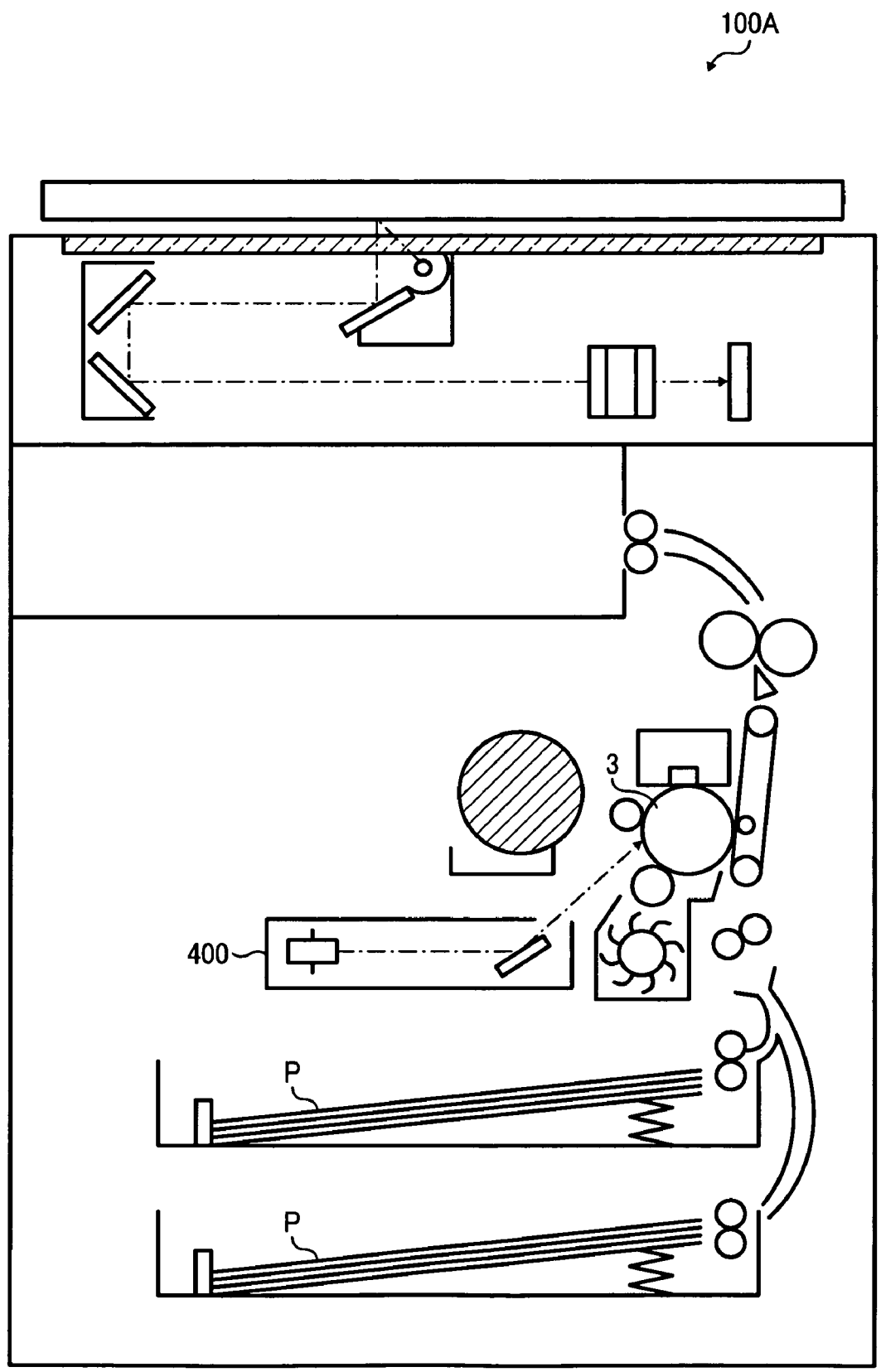
FIG. 25 is a schematic sectional view of a monochrome image forming apparatus according to yet another example embodiment of the present invention.

Referring to FIG. 25, a description is now given of an optical writing unit 400. FIG. 25 is a schematic sectional view of an image forming apparatus 100A including the optical writing unit 400 and a photoconductor 3. According to the above-described example embodiments, the optical writing unit 4 is applied to the full color image forming apparatus 100 depicted in FIG. 1. However, the image forming apparatus 100A including the optical writing unit 400 is a monochrome image forming apparatus. It is to be noted that the optical writing unit 400 has a structure equivalent to that of the optical writing unit 4 depicted in FIG. 7.

Although the optical writing unit 4 of the image forming apparatus 100 uses a multi-beam scanning method for simultaneously scanning each surface of the photoconductors 10Y, 10C, 10M, and 10K using the LDAs 51A, 51B, 51C, and 51D as light sources for emitting a plurality of beams onto the photoconductors 10Y, 10C, 10M, and 10K, the optical writing unit 400 emits a single light beam onto a surface of the photoconductor 3 using a LD (laser diode) having a single light-emitting point as a light source. Since the optical writing unit 400 fixes the LD by sandwiching it between a positioning surface of a first case and a pressing surface of a pressing member, replacement of the LD is easier than a known optical scanner holding a LD by insertion method.

In addition, since the LD has a vertical divergence angle different from a lateral divergence angle to emit an elliptical light beam, in order to form a light beam passing through an aperture into a desired shape, a major axis of the elliptical light beam needs to correspond to an orientation of a slit of the aperture. Therefore, the LD is attached to the first case after being positioned in a rotational direction. However, for any number of reasons the LD may deviate from the above position in the rotational direction. In this example embodiment, a screw fastening the pressing member to the first case is loosened to reduce a force holding the LD in place, so that the LD can be adjusted such that the major axis of the elliptical light beam emitted from the LD corresponds to the orientation of the slit of the aperture while the LD is attached to the first case.

According to the above-described example embodiments, an optical scanner, that is, the optical writing unit 4 depicted in FIG. 1, for scanning a photoconductor as an object to be scanned, for example, the photoconductors 10Y, 10C, 10M, and 10K depicted in FIG. 1, with a light beam emitted from a LDA as a light source, that is, the LDAs 51A, 51B, 51C, and 51D depicted in FIG. 4, includes a positioning member, that is, the positioning surface 754 depicted in FIG. 7, for positioning the LDA in a direction of a light axis of the LDA, and a pressing member, that is, the pressing member 110 depicted in FIG. 7, for pressing the LDA in the axial direction thereof, so that the LDA is fixed by being sandwiched between the pressing member and the positioning member. Therefore, when the pressing member is merely removed from the optical scanner, the LDA loosens to be easily removed from the optical scanner. Thus, replacement of the LDA is easier than a known optical scanner in which a LDA is fixed by being pressed into a mounting portion.

Since the LDA is merely sandwiched between the pressing member and the positioning member, when a pressing force of the pressing member is reduced to loosen the LDA, the LDA can rotate. Therefore, after the LDA is attached to the optical scanner, when the LDA is rotated to adjust a beam pitch or a shape of the light beam emitted from the LDA.

Moreover, compared to a conventional optical scanner in which a light source unit including an LDA is fixed to a first case, since the LDAs 51A, 51B, 51C, and 51D are directly fixed to the first case 70, the number of components of the optical writing unit 4 and the costs thereof can be reduced.

Due to use of the optical writing unit 4 depicted in FIG. 3 or the optical writing unit 400 depicted in FIG. 25, the image forming apparatus 100 depicted in FIG. 1 or the image forming apparatus 100A depicted in FIG. 25 can form a high-quality image without becoming smaller or larger than the actual size.

The present invention has been described above with reference to specific example embodiments. Nonetheless, the present invention is not limited to the details of example embodiments described above, but various modifications and improvements are possible without departing from the spirit and scope of the present invention. The number, position, shape, and the like, of the above-described constituent elements are not limited to the above-described example embodiments, but may be modified to the number, position, shape, and the like, which are appropriate for carrying out the present invention. It is therefore to be understood that within the scope of the associated claims, the present invention may be practiced otherwise than as specifically described herein. For example, elements and/or features of different illustrative example embodiments may be combined with each other and/or substituted for each other within the scope of the present invention.

What is claimed is:

1. An optical scanner for scanning an object, comprising:
   at least one light source to emit a light beam to the object, the light source including a laser diode array;
   an optical element to form the light beam emitted from the laser diode array of the light source into a desired shape;
   a deflective scanner to deflect the light beam;
   an optical housing to house the optical element and the deflective scanner, the optical housing including at least one positioning member to position the laser diode array of the light source in an axial direction of the light source by abutting the laser diode array against the positioning member in the axial direction of the light source;
   a pressing member to press the laser diode array of the light source towards the positioning member to sandwich the laser diode array of the light source between the pressing member and the positioning member and mount the light source on the optical housing, the pressing member having a rectangular plate-like shape;
   the pressing member further includes:
     a plurality of pressing surfaces to contact the light source to press the light source; and
     a mounting surface to be attached to the optical housing, and
     at least a peripheral portion of the pressing surface elastically deforming when the pressing member is fixed to the optical housing;
   a mounting member to fasten the pressing member to the optical housing;
   a through-hole through which a feeding member of the laser diode array is inserted to be provided in a substantially central portion of the pressing member; and
   a pressing member positioning assembly to position the pressing member in a rotational direction before the pressing member is fixed to the optical housing.

2. The optical scanner according to claim 1, wherein the mounting member comprises a screw to fix the pressing member to the optical housing.

3. The optical scanner according to claim 2, further comprising a slide member provided between the screw and the pressing member to slide over at least one of the screw and the pressing member in a rotational direction of the screw when the pressing member is fixed to the optical housing.

4. The optical scanner according to claim 1, wherein the pressing surface is disposed parallel to the mounting surface in the axial direction of the light source and perpendicular to the axial direction of the light source.

5. The optical scanner according to claim 1, wherein the plurality of pressing surfaces is provided in a single plane, and a number of the plurality of pressing surfaces is in the range of from two to three.

6. The optical scanner according to claim 5, wherein a contact area of each pressing surface and the light source is equal.

7. The optical scanner according to claim 1, wherein the pressing member presses a surface of the light source opposite to a light-emitting surface of the light source when the pressing member is fixed to the optical housing.

8. The optical scanner according to claim 1, further comprising a control board to control the light source, wherein the pressing member is provided between the light source and the control board.

9. The optical scanner according to claim 1, wherein the positioning member comprises a plurality of positioning surfaces provided in a single plane and disposed perpendicular to the axial direction of the light source, and a number of the plurality of positioning surfaces is in the range of from two to three.

10. The optical scanner according to claim 9, wherein the pressing member further comprises a plurality of pressing surfaces disposed in a single plane, a number of the plurality of positioning surfaces is equal to a number of the plurality of pressing surfaces, and each pressing surface of the plurality of pressing surfaces opposes one of the positioning surfaces of the plurality of positioning surfaces across the light source.

11. The optical scanner according to claim 1, wherein the optical housing comprises a recessed portion in the axial direction of the light source between an edge of the pressing member and the optical housing when the pressing member is fixed to the optical housing.

12. The optical scanner according to claim 1, wherein the pressing member comprises a mounting surface attachable to the optical housing, the mounting surface comprising a curved outermost edge.

13. The optical scanner according to claim 1, wherein at least two positioning members position at least two light sources, and the pressing member presses the light sources when the pressing member is fixed to the optical housing.

14. The optical scanner according to claim 1, wherein the pressing member positioning assembly comprises a convex portion provided in the optical housing; and an engaging hole provided in the pressing member to engage the convex portion.

15. An optical scanner for scanning an object, comprising:
   at least one light source to emit a light beam to the object;
   an optical element to form the light beam emitted from the light source into a desired shape;
   a deflective scanner to deflect the light beam;
   an optical housing to house the optical element and the deflective scanner, the optical housing including at least one positioning member to position the light source in an axial direction of the light source;
   a pressing member to press the light source towards the positioning member to sandwich the light source between the pressing member and the positioning member and mount the light source on the optical housing;

a mounting member to fasten the pressing member to the optical housing; and a pressing member positioning assembly to position the pressing member in a rotational direction before the pressing member is fixed to the optical housing, wherein the pressing member positioning assembly includes:

a first convex portion provided in a position other than a central portion of a first edge surface of the pressing member extending in a longitudinal direction of the pressing member; and a second convex portion provided in a position other than a central portion of a second edge surface of the pressing member opposite the first edge surface extending in a longitudinal direction of the pressing member.

16. The optical scanner according to claim 15, wherein the pressing member presses the light source in the central portion of the pressing member in the longitudinal direction of the pressing member, and wherein the first convex portion and the second convex portion are provided outboard of the mounting member of the pressing member.

17. An image forming apparatus, comprising:

a latent image carrier to carry a latent image;

an optical scanner to scan a surface of the latent image carrier to form the latent image on the surface of the latent image carrier; and a development device to develop the latent image carried by the latent image carrier into a visible image, the optical scanner including:

a light source to emit a light beam to an object, the light source including a laser diode array;

an optical element to form the light beam emitted from the light source into a desired shape;

a deflective scanner to deflect the light beam;

an optical housing to house the optical element and the deflective scanner, the optical housing comprising a positioning member to position the laser diode array of the light source in an axial direction of the light source by abutting the laser diode array against the positioning member in the axial direction of the light source;

a pressing member to press the laser diode array of the light source towards the positioning member to sandwich the light source between the pressing member and the positioning member and mount the light source on the optical housing, the pressing member having a rectangular plate-like shape;

the pressing member further includes:

a plurality of pressing surfaces to contact the light source to press the light source; and a mounting surface to be attached to the optical housing, and at least a peripheral portion of the pressing surface elastically deforming when the pressing member is fixed to the optical housing;

a mounting member to fasten the pressing member to the optical housing;

a through-hole through which a feeding member of the laser diode array is inserted to be provided in a substantially central portion of the pressing member; and a pressing member positioning assembly to position the pressing member in a rotational direction before the pressing member is fixed to the optical housing.

* * * * *